(12) United States Patent
Akachi

(10) Patent No.: US 7,069,436 B1
(45) Date of Patent: Jun. 27, 2006

(54) INFORMATION TRANSMISSION SYSTEM AND METHOD, TRANSMITTING APPARATUS, RECEIVING APPARATUS, DATA PROCESSING DEVICE AND DATA PROCESSING METHOD, AND RECORDING MEDIUM

(75) Inventor: Masateru Akachi, Saitama (JP)

(73) Assignee: Sony Corporation (JP)

( * ) Notice: Subject to any disclaimer, the term of this patent is extended or adjusted under 35 U.S.C. 154(b) by 869 days.

(21) Appl. No.: 09/869,515

(22) PCT Filed: Nov. 1, 2000

(86) PCT No.: PCT/JP00/07682

§ 371 (c)(1),
(2), (4) Date: Oct. 10, 2001

(87) PCT Pub. No.: WO01/33771

PCT Pub. Date: May 10, 2001

(30) Foreign Application Priority Data

Nov. 1, 1999 (JP) ............................... P11-311651
Nov. 5, 1999 (JP) ............................... P11-314521

(51) Int. Cl.
  *H04L 9/00* (2006.01)
  *H04K 1/00* (2006.01)
(52) U.S. Cl. ...................................................... 713/162
(58) Field of Classification Search ................. 713/162, 713/401; 712/240; 380/278; 710/68
See application file for complete search history.

(56) References Cited

U.S. PATENT DOCUMENTS 4,386,416 A * 5/1983 Giltner et al. ................ 710/68

(Continued)

FOREIGN PATENT DOCUMENTS

CA  2194421  7/1997

OTHER PUBLICATIONS

Mogul, Jeffrey, "Broadcasting Onternet Datagrams", RFC919, Oct., 1984, pp. 1-8.

(Continued)

*Primary Examiner*—Ayaz Sheikh
*Assistant Examiner*—Arezoo Sherkat
(74) *Attorney, Agent, or Firm*—Lerner, David, Littenberg, Krumholz & Mentlik, LLP

(57) ABSTRACT

Data is sent to one or more processing devices which have corresponding addresses. At least a portion of the data is encoded, and a control address is attached to the portion of the data. The control address is associated with the corresponding address of a respective one of the processing devices when the portion of the data is intended solely for the respective processing device. At least a segment of the control address is associated with a group of the processing devices when the portion of the data is intended for each processing device in the group. The portion of the data is transmitted and received, and a control address is read from the received portion of the data. The received portion of the data is decoded to form decoded data when the portion is intended for a group of the processing devices that includes the respective processing device or when the data is intended solely for the respective processing device. The portion of the data is determined to be intended for the group by comparing at least a segment of the control address to a corresponding segment of a stored address that is associated with the group where the segment of the control address and the corresponding segment of the stored address are identified by a stored mask sequence. The portion of the data is determined to be intended solely for respective processing device by comparing the control address to the corresponding address of the respective processing device. The decoded data is delivered to the respective processing device.

51 Claims, 13 Drawing Sheets

U.S. PATENT DOCUMENTS

| | | | | |
|---|---|---|---|---|
| 5,379,289 | A | * | 1/1995 | DeSouza et al. ............ 370/230 |
| 5,434,985 | A | * | 7/1995 | Emma et al. ............... 712/240 |
| 5,485,221 | A | * | 1/1996 | Banker et al. .............. 348/563 |
| 5,659,615 | A | * | 8/1997 | Dillon ....................... 713/162 |
| 5,784,597 | A | * | 7/1998 | Chiu et al. .................. 713/401 |
| 6,141,749 | A | * | 10/2000 | Coss et al. .................. 713/162 |
| 6,154,839 | A | * | 11/2000 | Arrow et al. ............... 713/154 |
| 6,483,833 | B1 | * | 11/2002 | Jagannath et al. .......... 370/392 |
| 2001/0002212 | A1 | * | 5/2001 | Asano et al. ............... 380/278 |
| 2003/0115345 | A1 | * | 6/2003 | Chien et al. ................ 709/229 |

FOREIGN PATENT DOCUMENTS

| | | |
|---|---|---|
| CA | 2282159 | 4/2000 |
| EP | 0 784 392 A2 | 7/1997 |
| EP | 0 993 153 A1 | 4/2000 |
| JP | 2000-312225 | 12/1988 |
| JP | 9-252294 | 9/1997 |
| JP | 10-210066 | 8/1998 |
| JP | 10-215244 | 8/1998 |

OTHER PUBLICATIONS

Asano, Tomoyuki, et al. "Conditional Access System for PRISM Prototype", Sony Research Forum 1996 Ronbunshuu, Feb. 1, 1997, pp. 300-304.

* cited by examiner

| # 1 | Vaild | MAC ADDRESS #1 (48bit) | MASK #1 (48bit) | Vaild | K1Even(mbit) | Vaild | K1Odd(mbit) |
| --- | --- | --- | --- | --- | --- | --- | --- |
| #2 | Vaild | MAC ADDRESS #2 (48bit) | MASK #2 (48bit) | Vaild | K2Even(mbit) | Vaild | K2Odd(mbit) |
| #3 | Vaild | MAC ADDRESS #3 (48bit) | MASK #3 (48bit) | Vaild | K3Even(mbit) | Vaild | K3Odd(mbit) |
| ⋮ | | | | | | | |
| #4 | Vaild | MAC ADDRESS #n (48bit) | MASK #n (48bit) | Vaild | KnEven(mbit) | Vaild | KnOdd(mbit) |

FIG. 5

| ENTRY#1 | Valid | MAC address #1 (48bit) | | Valid | KEven#1 (m bit) | | Valid | KOdd#1 (m bit) |
|---|---|---|---|---|---|---|---|---|
| ENTRY#2 | Valid | MAC address #2 (48bit) | | Valid | KEven#2 (m bit) | | Valid | KOdd#2 (m bit) |
| ENTRY#3 | Valid | MAC address #3 (48bit) | | Valid | KEven#3 (m bit) | | Valid | KOdd#3 (m bit) |
| ENTRY#N | Valid | MAC address #N (48bit) | | Valid | KEven#N (m bit) | | Valid | KOdd#N (m bit) |

FIG. 11

INFORMATION TRANSMISSION SYSTEM AND METHOD, TRANSMITTING APPARATUS, RECEIVING APPARATUS, DATA PROCESSING DEVICE AND DATA PROCESSING METHOD, AND RECORDING MEDIUM

BACKGROUND OF THE INVENTION

The present invention relates to an information transmission system and method, transmitting apparatus, and receiving apparatus for delivering information over a transmission path, such as via a satellite. In addition, the invention relates to a data processing device, a data processing method, and a recording medium, and in particular, relates to data processing devices, data processing methods and recording media for easily restricting user terminals from obtaining broadcast data, such as data broadcast over a satellite circuit.

Conventional digital satellite broadcasting systems utilize conditional access (CA) in which only legitimate subscribers who have signed up or contracted for reception are allowed to receive the broadcast.

In conditional access, a private key is given in advance to subscribers who have signed a contract for reception. A transmitter encrypts the broadcast data, using the private key, and transmits the data via a satellite. Then, the subscribers decode the received encrypted signals using the private key, which permits only those subscribers who have contracted for reception to watch and listen to the broadcast.

In recent years, satellite data transmission systems may transmit as part of a digital satellite broadcasting system. Because the satellite circuit has a much faster transmission speed when compared to other systems, such as standard telephone circuits and ISDN, large amounts of data may be transmitted in a short time.

In the satellite data transmission system, various reception controls may be used for (i) general message communication to transmit the same data to all recipients (known as a "broadcast"), (ii) group communication to transmit the same data to a specific group of recipients (known as a multicast), or (iii) individual communication to transmit a different set of data to each individual (known as a "uni-cast). Thus, the potential uses for a satellite data transmission system are significantly increased.

The conditional access system, however, has the problem that reception control cannot be used for a uni-cast or multicast communication because this system is designed with the assumption that all the recipients receive and watch the same information.

Further, a greater plurality of channels may be delivered in the same band as digital data that is transmitted in the form of analog signals. Also, higher quality images and sounds are provided when transmitted in the form of digital data. Thus, satellite broadcasting and satellite communication systems, which provide images and sounds in the form of digital data, are proliferating. Such digital satellite broadcast services include SkyPerfect TV! and DirecTV in Japan, DirecTV in the United States, and Canal Plus in Europe. The digitalization of broadcasts reduces the broadcast cost per channel and provides programs and data that are processed by computer. Also, digitalization permits the widespread use of services in which programs, images, etc. are provided that are linked to each other.

In a digital satellite broadcast service, digital data representing images and sounds are converted into a format, such as the Moving Picture Experts Group (MPEG)2 format or the Digital Video Broadcasting (DVB) format which is derived from the MPEG 2, and then multiplexed for transmission in the form of radio waves. The radio waves are transmitted and received by the transponder of a satellite, where the radio waves are amplified and subjected to other processes for re-transmission to the earth.

The transmission band for the transponder may be as wide as 30 Mbps (Megabits per second) so that digital data of high quality may be distributed at high speed utilizing the whole width of the band. Though the actual transponder transmission band is 30 Mbps, a real transmission band is around 27 Mbps, at most, to allow the inclusion of error correction codes.

Generally, the transmission band for the transponder is divided into many bands of multiple channels to reduce cost. Though the content of the digital data transmitted on each channel differs, the mechanism by which the receivers receive the digital data on each channel remains the same. Consequently, a conditional access (CA) mechanism is needed to allow only permitted users to receive the digital data.

For data broadcast, in particular, the quantity of data per program is small when compared to the images or sounds distributed so that a charging unit or charging system is expected to become more complex. Therefore, a conditional access mechanism capable of performing more specific reception control is needed to address such a problem. The conditional access mechanism is also required to prevent passage of secret information during distribution.

Generally, conditional access is attained by performing encryption on a data stream before it is distributed. Two types of encryption methods are known, namely (i) a common key cryptosystem, also known as a private key cryptosystem, and (ii) a public key cryptosystem. For digital satellite broadcasting, the common key cryptosystem is more common because of a smaller number of encryption/decryption processes are used when compared to the public key cryptosystem.

In the common key cryptosystem, a row of codes that comprise a decryption key and correspond to an encryption key is given to a subscriber A by some method. Data is encrypted for distribution using the encryption key. The encrypted data is designed to make it hard to derive the encryption key, decryption key or the original data, whether by converse calculations or other means. Thus, a non-subscribed user B cannot accurately restore the original data even if the user B receives the encrypted data. On the other hand, the subscribed user A can restore the original data by decrypting the encrypted data using the decryption key given when the contract is made. Therefore, the making of a contract for reception is equivalent to reception of a decryption key.

When both users A and C are subscribers, for example, and the contract with A expires, or when the user A does a wrong action, the current encryption key is changed, and a decryption key equivalent to the new encryption key is provided to user C only. Thus, the user A who was previously a subscriber or did a wrong act cannot decode data encrypted with the new encryption key, whereas the legally subscribed user C can readily decode the data encrypted with the new encryption key.

It is difficult, however, to alter an encryption key, and it is further difficult to provide a new decryption key corresponding to a new encryption key to lawful subscribers whenever the subscription of another user expires or whenever improper conduct is discovered.

SUMMARY OF THE INVENTION

The present invention provides an information transmission system and method, transmitting apparatus, and receiving apparatus that are capable of performing reception control in various modes. In addition, the present invention easily restricts users that can obtain (or receive) data correctly.

To solve such problems, an information transmission method according to an aspect of the present invention transmits data from a transmitting apparatus through a predetermined transmission circuit to a plurality of receiving apparatus, each having an individual address. When the data is individually transmitted to the receiving apparatuses, an individual address for each receiving apparatus is affixed to the data. When common data is transmitted to a certain group of receiving apparatus, the data is affixed with common address information denoting a portion of their addresses that is common to all the receiving apparatuses of the voluntary group, as well as with address range information defining the portion that is common to all the addresses. The data is received and is decoded only when the individual address and the address affixed to the data coincide or only when the individual address and the common address information affixed to the data agree with each other within the portion denoted by the address range information.

According to another aspect of the invention, an information transmission method transmits data from a transmitting apparatus through a specified transmission circuit to a plurality of receiving apparatuses, each having an individual address. When common data is transmitted to the receiving apparatus of a certain group, the data is affixed with common address information denoting a portion of their addresses common to the receiving apparatuses of the voluntary group, as well as address range information defining the common portion of the address. On the side of receiving apparatuses, the individual address and common address information affixed to the data are compared based on the range denoted by address range information, and when the results of the comparison coincide with each other, the data can be decoded, thus easily performing reception control in various modes.

A data processing device according to a further aspect of the present invention comprises retrieving means for retrieving, as the marked entry, an entry having an address coinciding with the address of a data block by referring to a table having addresses and entry validity information that indicate whether the entry to which the address is registered is valid. Judgment means judges whether the marked entry is valid based on the entry validity information registered to the marked entry. Output control means controls the output of data arranged in the data block based on the judgment result obtained by the judging means.

When the marked entry is valid, the output control means outputs the data at an address arranged in the data block and may destroy the data when the marked entry is not valid. Furthermore, when the data is encrypted, the data processing device may be provided with a decoding means for decoding the encrypted data.

The data may be encrypted using a key assigned to the address of the data. Each entry of the table may have a registered key assigned to the address, in addition to the data address, and entry validity information. The decoding means may decrypt the data with the use of the key registered on the table.

The decoding means may decode data arranged in the data block using the key within the table assigned to the address of the data block. Key validity information indicating whether the key is valid may be registered to each entry in the table. The decoding means may judge whether the key is valid based on the key validity information of the key assigned to the address of the data block, and if the key is valid, the data may be decoded with the use of that key.

More than two keys assigned to the address may be registered to each entry of the table, in addition to the address and entry validity information. Key validity information indicating whether one or more of the keys are valid may be registered to each entry of the table.

The data processing device of the present invention may be furthermore provided with table storage means for storing the table. The address may be the Media Access Control (MAC) address of a communication terminal that receives data. Data blocks may conform to the Digital Video Broadcasting (DVB) specifications. The data processing device employing the present invention may be a one-chip Integrated Circuit (IC).

According to a still further aspect of the invention, a data processing method comprises retrieving, as the marked entry, an entry having an address coinciding with the address of a data block by referring to a table having addresses and having entry validity information that indicates whether the entry is valid. The validity of the marked entry is judged based on the entry validity information registered to the marked entry. The output of data arranged in the data block is controlled based on the judgment result obtained.

A recording medium according to yet another aspect of the present invention comprises instructions for retrieving, as the marked entry, an entry having an address coinciding with the address of a data block by referring to a table. The table contains an address and contains entry validity information that indicates whether the entry to which the address is registered is valid. The validity of the marked entry is determined based on the entry validity information registered to the marked entry. The output of data arranged in the data block is controlled based on the judgment result obtained by the judging means.

According to an additional aspect of the invention, a data processing device, data processing method, and recording medium retrieve, as the marked entry, an entry having an address coinciding with the address of a data block and refer to a table containing an address as well as containing entry validity information indicating whether the entry to which the address is registered is valid. Whether the marked entry is valid is judged based on the entry validity information that is registered to the marked entry. The output of data arranged in the data block is controlled based on this result.

According to the data processing device, the data processing method and the recording medium, an entry having an address matching the address of a data block is retrieved as the marked entry from a table by referring to the same table that has an entry registering an address and entry validity information indicating whether an entry to which the address is registered is valid. It is judged, based on the entry, whether the validity information registered to the marked entry whether the marked entry is valid. Based on this result, the output of data arranged in a data block is controlled. Thus, it is possible to easily restrict the users that are capable of obtaining data normally.

BRIEF DESCRIPTION OF THE DRAWINGS

FIG. 5 is a schematic diagram showing the data structure of a key table.

FIG. 11 is a diagram showing a key table.

DETAILED DESCRIPTION

Embodiments of the present invention are now explained in detail with reference to the drawings.

Figure 1:
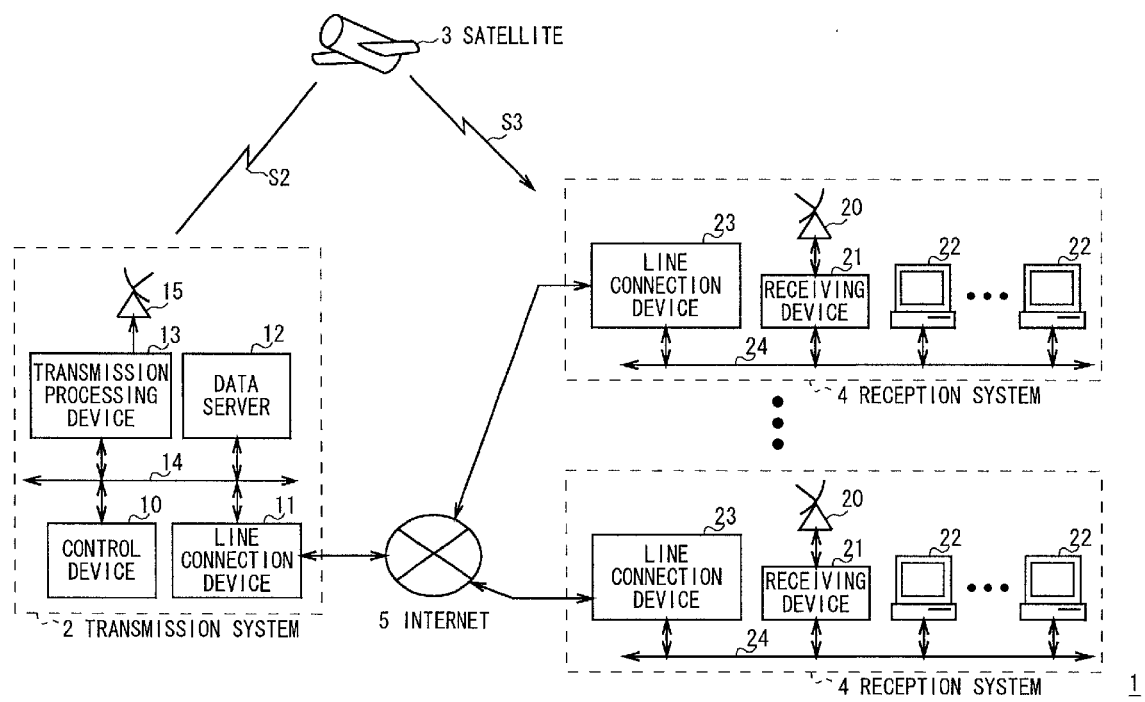
FIG. 1 is a block diagram showing the structure of a satellite data transmission system according to an embodiment of the present invention.

(1) First Embodiment (1-1) Whole Structure of Satellite Data Transmission System FIG. 1 shows a satellite data transmission system 1 to which the present invention is applied. The system 1 includes a transmission system 2, a satellite 3, and a plurality of reception systems 4 each having substantially the same structure. The transmission system 2 and each of the reception systems 4 are connected via the Internet 5. An agreement permitting use of the satellite data transmission system 1 is typically made in advance between a service provider that manages the transmission system 2 and each of the recipients that have a reception system 4.

The transmission system 2 includes a control device 10, which controls the transmission system 2, a circuit connection device 11, a data server 12, and a transmission processing device 13 which are connected to each other over a local network 14.

The control device 10 receives data read-out demands that are transmitted by an information processing device 22 in the reception system 4. In response to the data read-out demand, the control device 10 reads out data from the data server 12 or from an external data server (not shown) received via the Internet 5. The data is then fed to the transmission processing device 13 by the device 10.

The transmission processing device 13 stores an encryption key correspondence table which holds the Media Access Control (MAC) addresses, namely the identification numbers corresponding to the respective information processing devices 22, and which holds the private keys that correspond to each of the MAC addresses. Using the encryption key correspondence table, the transmission processing device 13 encrypts the read data using a private key that matches the MAC address of an information processing device 22 that is the transmission destination. The transmission processing device 13 then assigns a value of "1" to the Common Key Indicator (CKI) of the data. Alternatively, the device 13 encrypts the data using a given common key and assigns a CKI value of "0". The transmission processing device 13 packets the encrypted data in accordance with the Digital Video Broadcasting (DVB) data broadcast specification, and a transmitter 15 then transmits the formatted data as an uplink wave S2 to the satellite 3.

After receiving the uplink wave S2, the satellite 3 amplifies the wave and re-transmits the wave to the reception system 4 as a downlink wave S3. The reception system 4 includes a receiving device or apparatus 21, a line or circuit connection device 23, and a plurality of information processing devices 22 which may be, for example, personal computers. The receiving apparatus 21, the processing devices 22, and the circuit connection devices 23 are connected to one another using a local area network 24.

The receiving apparatus 21 decodes data transmitted to the information processing device 22 by demodulation processing and decode processing the downlink wave S3 that is received via a receiving antenna 20. The receiving apparatus 21 then supplies the decoded data to the information processing device 22.

When a user initiates a data read-out demand, the information processing device 22, in response to the demand, transmits the data read-out demand to the transmission system 2 via the circuit connection device 23 via the Internet 5.

(1-2) Structure of Receiving Apparatus

Figure 2:
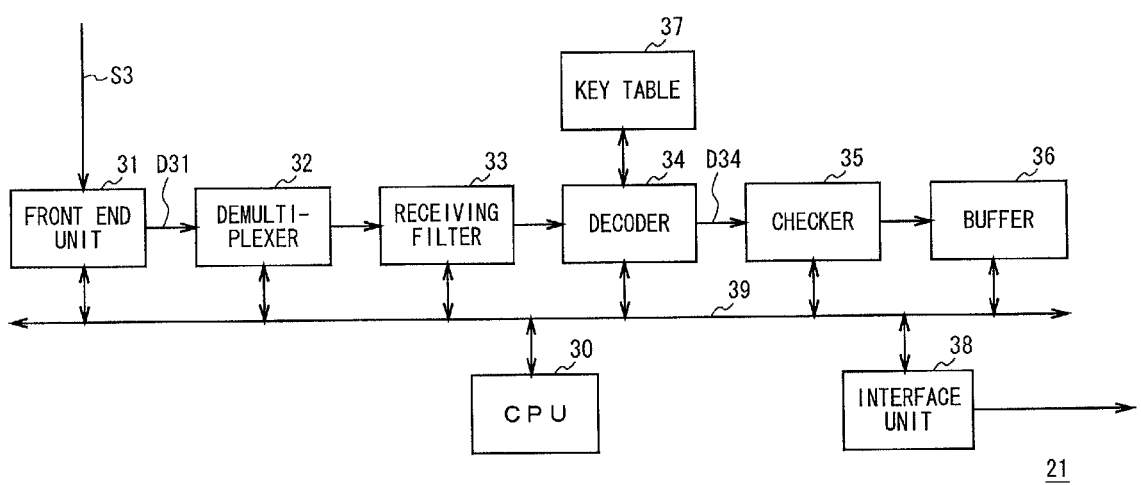
FIG. 2 is a block diagram showing the structure of the receiving device shown in FIG. 1.

The receiving apparatus 21 in the reception system 4 is now described in greater detail with reference to FIG. 2. The receiving apparatus 21 includes a Central Processing Unit (CPU) 30 which controls the receiving apparatus 21 and which is connected, via a bus 39, to a front end unit 31, a demultiplexer 32, a receiving filter 33, a decoding unit 34, a checker 35, a buffer 36, a key table 37, and an interface unit 38.

The front end unit 31 demodulates the downlink wave S3 that is received via the receiving antenna and feeds the demodulated wave as a data stream D31 to the demultiplexer 32. The demultiplexer 32 separates necessary packets from the data stream D31 based on their Packet ID's (PID's) and supplies the packets to the receiving filter 33. The receiving filter 33 checks the payloads of the packets and eliminates any packets that are unnecessary for data decode processing.

In accordance with a decoding process described herein, the decoding unit 34 refers to a key table 37, using the MAC address of the information processing device 22, to obtain a decoding key from the key table 28. The decoding unit 34 then decodes the data stream D31 using the decoding key and supplies the resultant decoded data D34 to the checker 35.

The checker 35 determines whether or not the decoded data D34 was decoded correctly. Then, in response to a demand from the CPU 30, the buffer 36 inputs the decoded data D34 to the interface unit 38 via the bus 39. The interface unit 38 then supplies the decoded data D34 to the information processing device 22 over the local network 24.

In this manner, the receiving apparatus 21 receives the downlink wave S3, extracts only the data that is to be supplied to the information processing device 22, and supplies the data thereto.

(1-3) Decode Processing of Digital Stream

Figure 3:
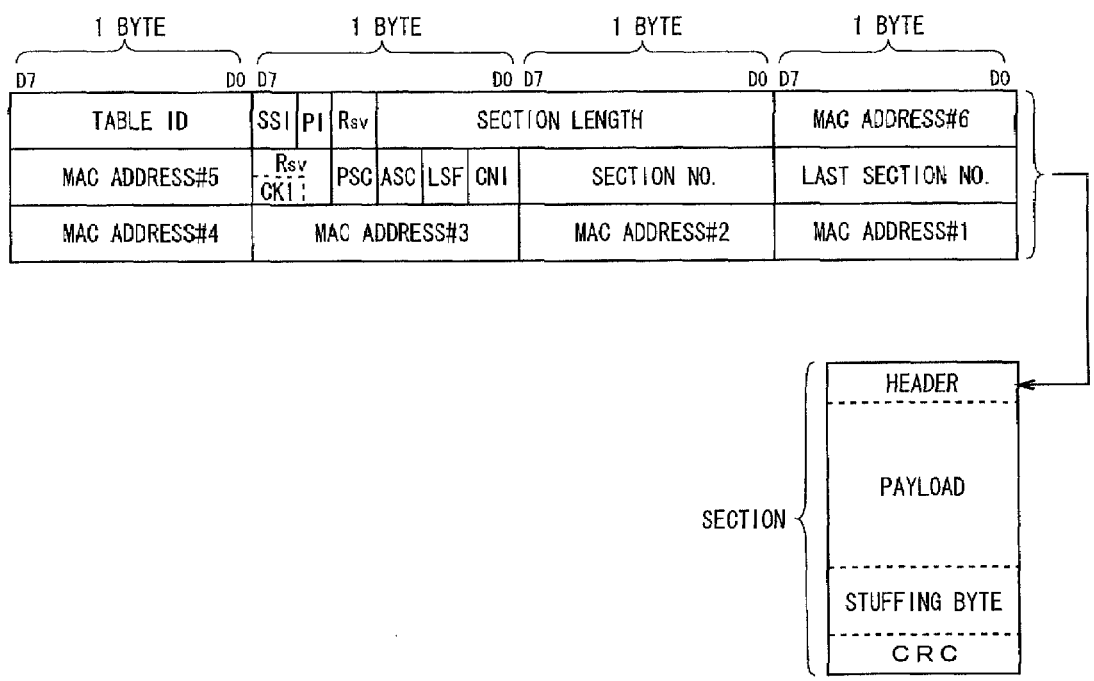
FIG. 3 is a schematic diagram showing a header format.

Referring to FIG. 3, the digital stream D31 includes packet information located at the top of a payload section as well as stuffing byte that indicates the presence of an invalid byte and a Cyclic Redundancy Code (CRC) that are located at the bottom of the payload section. The digital stream is encapsulated to be processed as a section defined according to the DVB data broadcasting specification, known as a Datagram-section. The Datagram Section includes a six byte MAC address, identified as MAC address #1 to MAC address #6, each of which is comprised of a byte (8 bits) having bits from Bit D7 to Bit D0. The highest bit of the MAC address is at Bit D7 and the lowest is at Bit D0.

Referring back to FIG. 2, the decoding unit 34 determines whether to receive a packet based on the MAC address stored in each packet of the received data stream D31 and based on the key table 37. Here, the receiving apparatus 21 may perform (i) a mask bit process to determine the bit positions that are to be compared with those of the MAC address of a packet, (ii) a MAC address conversion which converts the MAC address of a packet into a value having fewer bits and then discriminates packets using the converted value, or (iii) a MAC address pass process to let the packets having a specific MAC address pass unconditionally.

The mask bit process takes a logical product between the mask bit and the result of a comparison between the MAC address of the section header and the MAC address in the key table 37. Specifically, the following relation represents the process carried out for each bit in the range of $0 \leq k \leq 47$:

$$(\sim(MR_1 \wedge MAC_1(k))) \, \& \, MASK_1(k) \quad (1),$$

where $\wedge$ represents an exclusive OR operation, & represents a logical product, $MR_1$ is the MAC address read from the session header and stored in the MR register, $MAC_1(k)$ is the k-th MAC address stored in the key table, and $MASK_1(k)$ is the k-th mask value stored in the key table. When the logical product is "0", the masked portions of the two MAC addresses are identical.

Figure 4:
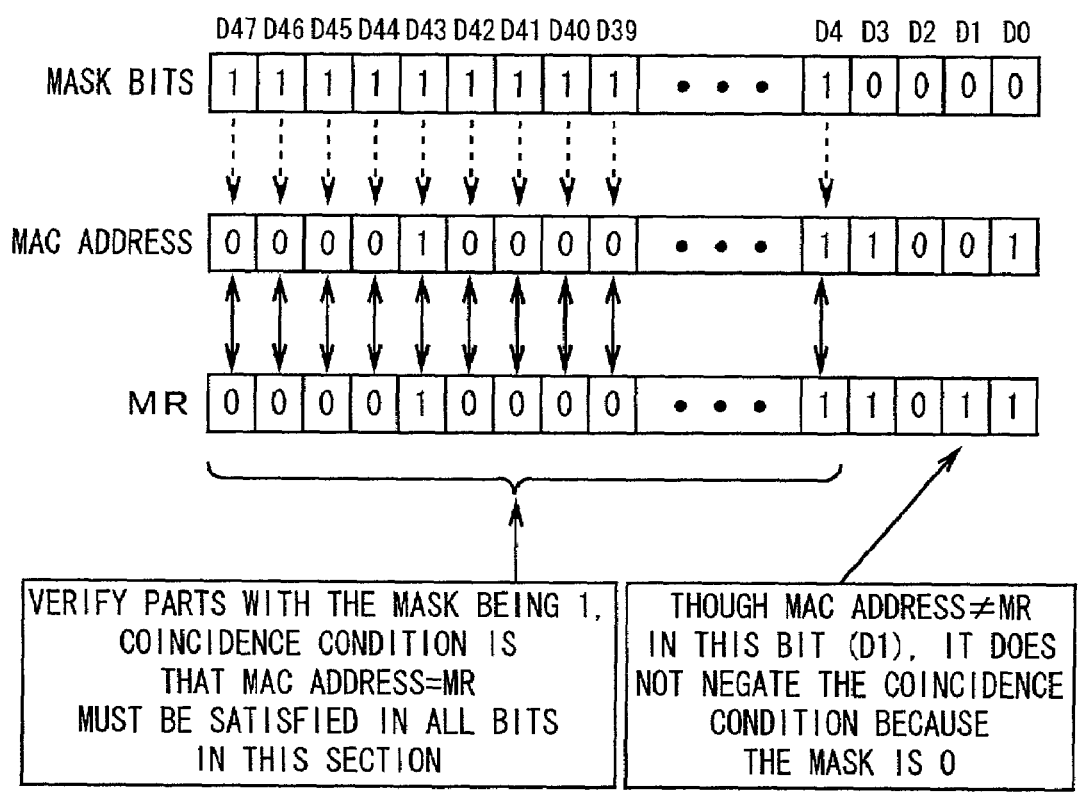
FIG. 4 is a schematic diagram showing the relation between a mask and the MAC addresses.

Thus, bits of the MR and the MAC addresses are compared only where the mask has a bit value "1". FIG. 4 shows an example of the relation between each mask bit and the comparison operation between the MAC address stored in the MR register and a MAC address stored in the key table.

FIG. 4 shows an example in which the mask bits are "0" from bit D0 to bit D3 and are "1" from bit D4 to bit D47. When a mask address is checked based on the mask bits, a MAC address in the key table and the MAC address in register MR are compared from bits D4 to D47, namely the bits where the mask bits are all "1". By contrast, the MAC address and the register MR need not be the same in bits D0 to D3 where the mask bits are all "0". Thus, by checking only part of the MAC addresses using the mask bits, it is possible to carry out a multicast or group communication whereby the same packets are distributed to certain information processing devices 22 having different MAC addresses. Also, when all the mask bits are "1", that is "0xFFFFFFFFFFFF", all the bits of the MAC address are checked, so that a uni-cast (individual communication) can be carried out.

When carrying out a multicast using mask bits, it is assumed that a common part exists in the MAC address of each information processing device 22 that is to receive the multicast data. However, such MAC addresses are hard to prepare, and further flexibility may be wanted when running a system. In this case, the problem can be solved by artificially creating a common part in the MAC addresses of the devices 22 by rewriting the packet header based on a correspondence table of the MAC addresses of actual information processing devices 22 and the MAC addresses described in the packet headers.

The MAC address conversion process uses a formula, such as a Hash function, for operating on an input MAC address to obtain a value having a smaller number of bits than the 48 bit MAC address and then searches a table, such as a Hash table, to determine whether to let the address pass with the obtained value used as a key. The number of bits is reduced so that the Hash table is made smaller. Any Hash function may be used as long as it is able to distribute input MAC addresses well. For example, for a CRC whose higher 6 bits are defined as p, when Pass (p)="1", the packet is allowed to pass, and when Pass (p)="0", the packet is destroyed. Here, the pass function is a table of $2^6=64$ bits. In this way, the circuit scale of the decoder unit 34 can be made smaller by reducing the number of bits of a MAC address using the Hash function.

The MAC address passage process lets the packet pass if a MAC address described in the header of a packet is an address for a specific broadcast regardless of its state in the key table. If a MAC address described in the header of a packet is of value 0xFFFFFFFFFFFF, known as a "broadcast address", the message is always considered a broadcast and allowed to pass. The MAC address passage process occurs prior to the mask bit process and MAC address conversion process. Thus, it is not necessary to search the key table when the MAC address described in the packet header is a broadcast address, resulting in improved process speed.

In this manner, the decoding unit 34 discriminates packets based on a MAC address described in the header of a packet, the MAC address of an information processing device 21, and mask bits.

Subsequently, the decoding unit 34 detects whether or not the above discriminated packets are encrypted. If the packets have been encrypted, decoding is performed using a decoding key taken from a key table. For a broadcast, however, a common key is prepared which is a decoding key that is common to a plurality of MAC addresses.

The receiving apparatus 21 judges whether to use a common key using the section that is the 6th byte from the highest, namely bit D7 of the second byte on the second line in FIG. 3. This value is called a Common Key Indicator (CKI). When the CKI value is "1", an individual key is used and is extracted from the key table using the register MR, the MAC address, and the mask bit. When the CKI value is "0", the common key is used regardless of the setting of the key table. In the DVB data broadcast specifications, the CKI is defined as a "reserved" bit with "1" as its value. A common key is considered a special processing method when compared to an individual key, so that stipulating that a common key be used when the CKI is "0" attains agreement with the DVB data broadcast specifications.

Although a special storage area may be prepared for a soaring common key, it is preferable to store the data on a special line in the key table, so that the read-out process is the same as for an individual key and more efficiently uses the storage area. Preferably, the starting line, namely the first line, of the key table is designated as the special line. Because the first line exists regardless of the number of lines n of the key table, it is possible to retain or retrieve the common key without changing the order of the procedure regardless of whether receiving apparatuses exist that have different values of n.

FIG. 5 shows the structure of the key table 37. The "MAC address #1" denotes a 48-bit MAC address described on the first line of the key table, the "mask #1" denotes the 48 mask bits that correspond to the MAC address #1, and $k_{1Even}$, $k_{Odd}$ denote even and odd key data of that correspond to the MAC address #1. Each of the even and odd key data has a bit width m based on an encryption form. The key table comprises a plurality of n such data structures. The circuit scale of the key table 37 determines the upper limit of the value of n.

The MAC addresses and the key data each have its own independent valid flag to manage whether the individual values are valid, so that individual valid flags can be utilized to discriminate MAC addresses as well as key data. Also, because the key table has an independent flag for each line, the key table may contain vacant lines or invalid lines. Accordingly, to temporarily nullify the information of particular lines, the Valid bits of the MAC addresses are set to "0", which is preferable for a process carried out at high speed. The decoding unit 34 decodes packets using the decoding keys thus obtained.

(1-4) Decode Processing Procedure

Figure 6:
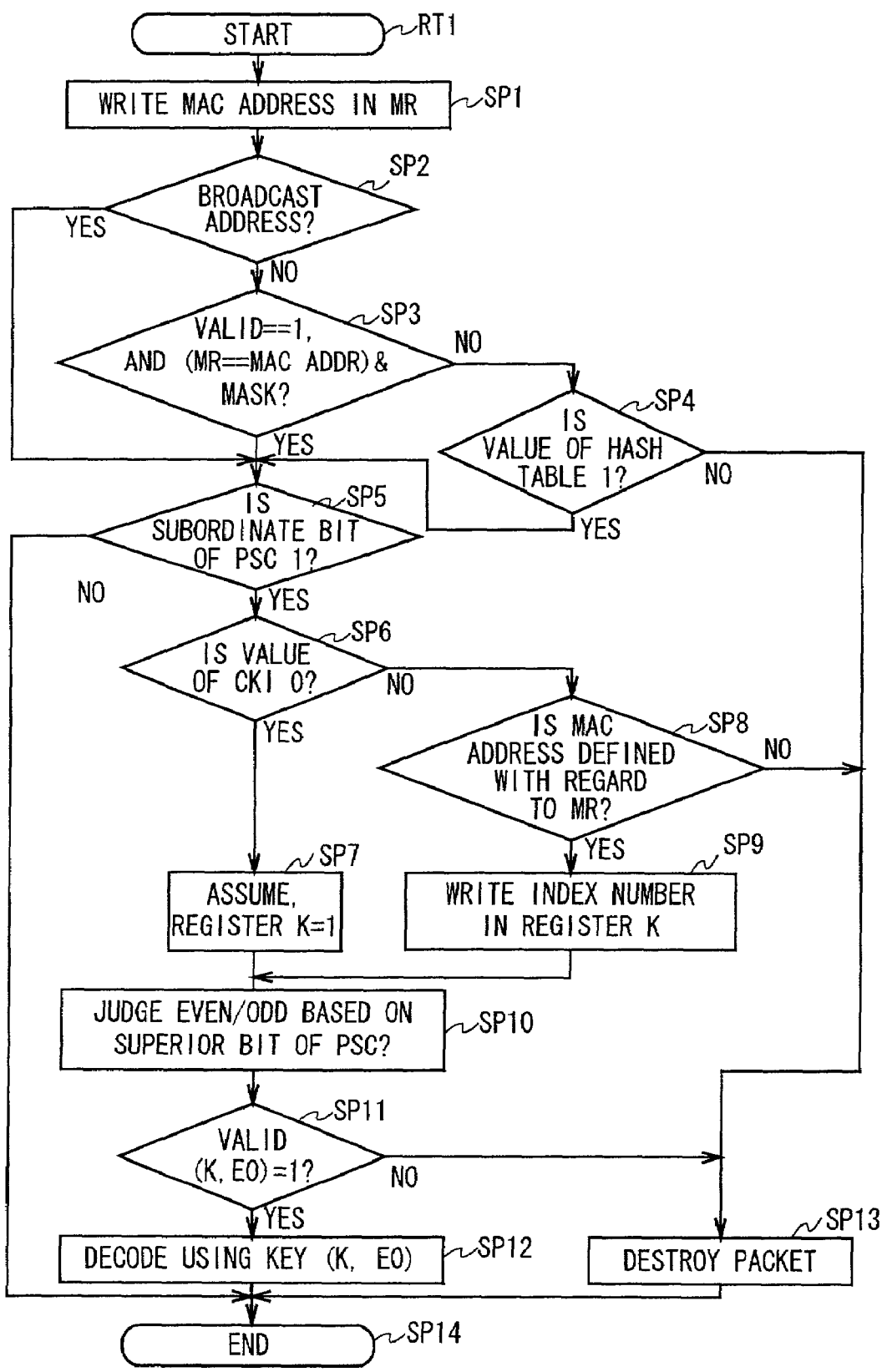
FIG. 6 is a flowchart illustrating the steps of a decode processing operation of the invention.

Next, an explanation of the decoding process for digital streams is given with reference to the flowchart of FIG. 6. The decoding unit 34 starts the processing, shown at step RT1, and writes the 48 bit MAC address of the packet header into a register MR, as shown at step SP1, and proceeds to the next step SP2.

At the step SP2, the decoding unit 34 judges whether the value of the register MR is equal to the broadcast address value, namely the value 0xFFFFFFFFFFFF. When an affirmative result is obtained, the unit 34 denotes that the value of the register MR is equal to the broadcast address, that is the packet is a broadcast packet. Omitting steps SP3 and SP4, the decoding unit 34 moves directly to the step SP5.

Alternatively, when a negative result is obtained at the step SP2, namely that the value of the register MR is not equal to the broadcast address value, the packet is not a broadcast packet. The decoding unit 34 then proceeds to the step shown at SP3.

As step SP3 shows, the decoding unit 34 searches each line of the key table 37, starting from line #1, using the above expression (1) to determine whether the Valid bits are of value "1", namely whether the line is in a valid state, and whether valid lines exist where the register MR and the MAC address are equal for all the bits of a section having the mask bit of value "1".

When an affirmative result is obtained at the step SP3, lines exist where the register MR and MAC address are equal in all the bits of a valid section having the mask bits of value "1", and the decoding unit 34 proceeds to step SP5. Alternatively, when a negative result is obtained, there is no line where the register MR and the MAC address are equal for all the bits of a valid section that have the mask bits of value "1". Then, the decoding unit 34 proceeds to the step SP4.

As shown at step SP4, the decoding unit 34 creates a Hash value out of the MAC address of the packet header using a Hash function and uses the Hash value to retrieve a specific Hash table value bit. The decoding unit then judges whether the Hash value bit has a value of "1".

When a negative result is obtained, the bit of the Hash table has value "0" which indicates that the packet is not a packet that a receiving apparatus 21 is to receive. Then, the decoding unit 34 proceeds to step SP13 and eliminates the packet and terminates processing, as shown at step SP14.

On the other hand, when an affirmative result is obtained, the bit of the Hash table has a value of "1", and thus the packet is one that the receiving apparatus is to receive. The decoding unit 34 then proceeds to step shown at SP5.

As step SP5 shows, the decoding unit 34 determines, based on the value of lower bits of the Payload Scrambling Control (PSC) of the packet header shown in FIG. 3, whether the packet is encrypted. When a negative result is obtained at the step SP5, the lower bits of value are "0", that is the packet is not encrypted. The decoding unit 34 then proceeds to the step shown at SP14, transfers the packet to the checker 35 without any encryption cancel processing, and terminates processing.

When an affirmative result is obtained, the lower bits are of value "1", namely the packet is encrypted. The decoding unit 34 then moves on to the shown at step SP6.

As shown at step SP6, the decoding unit 34 determines, based on the value of the CKI in the packet header shown in FIG. 3, whether the packet is encrypted using a common key. When an affirmative result is obtained, the CKI is of value "0", namely the packet has been encrypted using a common key. Then, the decoding unit 34 proceeds to the step shown at SP7 and substitutes a value of "1", denoting a common key for the register k, while retaining the retrieval numbers of the keys, and then proceeds to the step shown at SP10. On the other hand, when a negative result is obtained, the CKI is of value "1", that is the packet has been encrypted using an individual key, and the decoding unit 34 proceeds to the steps shown at SP8.

As step SP8 shows, the decoding unit 34 searches the key table, line by line, using the expression (1), and determines whether a MAC address exists that coincides with the register MR of the key table. Packets, which should not be received as a result of the discrimination operation using the Hash table of the step, SP4 are allowed to pass when the Hash values coincide. However, because these packets are re-discriminated at the step SP8, no decoding processing is carried out. Also, because the packets that are not encrypted will not pass through the step SP8, they are eliminated by a subsequent circuit or by the information processing device 22.

The key table is searched from the first line until a first coincidence is encountered. A valid address indicates that the Valid bits shown in FIG. 5 are in an activated state. As an example, assuming that an active state is the state where the Valid bits are of value "1", information on the lines with Valid bits of value "0" is invalid. Thus, when the Valid bits of the MAC address#2 are "0", the values are not referred to no matter what value is assigned to $K_{2Even}$, $K_{2Odd}$.

When a negative result is obtained at the step SP8, there are no MAC addresses coinciding with the MR of the key table, and the packet is not one that the receiving apparatus 21 is to receive. The decoding unit 34 then proceeds to the step shown at SP13, and destroys the packet, thereby terminating processing, as shown at step SP14.

On the other hand, when an affirmative result is obtained, MAC addresses exist that coincide with the MR which indicates that the packet are ones that the receiving apparatus 21 is to receive. The decoding unit 34 proceeds to the step shown at SP9 and substitutes, for the register k, the retrieval numbers of the keys with which the MAC addresses coincide under the condition of expression (1), and the unit 34 proceeds to the step SP10.

As shown at the step SP10, the decoding unit 34 judges, based on the higher bits of the PSC, whether the packet is encrypted with either a key in an Even period or with a key in an Odd period. When the higher bits of the PSC are of value "0", the packet is encoded with a key in an Even period, and when the higher bits of the PSC are of value "1", the packet is encoded with a key in an Odd period.

When the higher bits of the PSC are "0", the decoding unit 34 retrieves a key in an Even period from the key table and allocates the values of Valid bits of $K_{iEven}$ to the MAC address #I. When the higher bits of the PSC are "1", the decoding unit 34 retrieves a key in an Odd period from the key table and allocates the values of Valid bits of $K_{iOdd}$ to the MAC address #I. Then, the unit 34 proceeds to the step shown at SP11.

As step SP11 shows, the decoding unit 34 judges whether the value of the Valid bits retrieved are "1", namely whether the function Valid (k, EO)=1. When a negative result is obtained at the step SP11, Valid (k, EO) equals "0", that is though the packet is encrypted, no valid decoding key (individual key) exists. The decoding unit 34 then proceeds to the step shown at SP13 and destroys the packet, terminating the processing at the step SP14.

When an affirmative result is attained, namely Valid (k, EO) equals "1", that is a valid decoding key (individual key) exists, the decoding unit 34 proceeds to the step shown at SP12. As step SP12 shows, the decoding unit 34 retrieves a key (k, EO) from the key table 37, namely a decoding key that corresponds to the $k^{th}$ EO, with which the packets are decoded and later outputted to be checked at a later stage, thereby terminating the processing at the step SP14.

Thus, the decoding unit 34 performs packet decoding processing for each of the uni-cast, multicast, and broadcast modes based on of the key table 37 and the Hash table. Because the key retrieval processes, shown at steps SP5 to SP13, are performed independent of the discrimination processes of the MAC addresses, shown at steps SP1 to SP4, encryption processes may also be performed on the broadcast addresses. In this case, two common key setup methods are possible: (1) where a common key is designated as the decoding key with which corresponds to the broadcast address, and (2) where the broadcast address is stored in the key table as a MAC address and corresponds to an individual private key.

Using method (1), the system does not consume the storage area of the key table 37, but the system must share a common key with other modes. Using the method (2), the system consumes the storage area of the key table 37 but sets up a decoding key dedicated to a broadcast.

(1-5) Operation and Effect in this Embodiment

Thus, the decoding unit 34 also discriminates packets having the broadcast address value, namely "0xFFFFFFFFFFFF, based on the MAC address stored in each packet of the received data stream D31, and the unit discriminates the multicast packets by checking the MAC addresses using mask bits. The decoding unit 34 also calculates the Hash values of the MAC addresses, which determines the uni-cast packets that are discriminated.

Then, the decoding unit 34 detects whether the discriminated packets are encrypted, and when they are encrypted, decode processing is performed using a decoding key taken from the key table. At this time, the decoding unit 34 judges, based on the CKI of a packet, which key is to be used, namely whether the packet is encrypted using a common key or a private key, and the packet is decoded with either the common key or private key accordingly.

A specific MAC address value is defined as the broadcast address, and only part of the bits of the MAC address is checked using the mask bits so that various reception controls are available such as for broadcast, multicast, and uni-cast. Also, the number of MAC address bits is reduced using a Hash function, and packets are discriminated using the reduced MAC address, so that the circuit scale of the decoding unit 34 can be reduced.

(1-6) Other Modes of Embodiment

In the foregoing embodiment, a bit whose corresponding mask bit is "1" is compared with MAC addresses. However, the present invention is not limited to using such bits, but to the contrary, a bit whose corresponding mask bit is "0" may instead be compared.

Also, in the foregoing embodiment, a packet is destroyed when the result retrieved from the Hash table is "0". However, the present invention is not limited thereto, but to the contrary, the Hash table may be set up so that a packet is destroyed when the result retrieved from the Hash table is "1".

Furthermore, in the foregoing embodiment, the MAC address #6 is designated as the broadcast address, but the present invention is not limited thereto. Thus, another MAC address having a value other than "0xFFFFFFFFFFFF" may be designated as the broadcast address.

Furthermore, in the foregoing embodiment, processing is performed in the order of first discriminating broadcast addresses in the decode process (Step SP2), then checking MAC addresses on the key table (Step SP3), and thereafter retrieving the Hash table (Step SP4). However, the present invention is not thus limited, and decode processing may be carried out in another order.

Furthermore, the foregoing embodiment is explained where the present invention is applied to a satellite data transmission system. However, the present invention is not thus limited and may be applied to other data transmission systems such as a cabled Internet, for example.

(2) Second Embodiment

Figure 7:
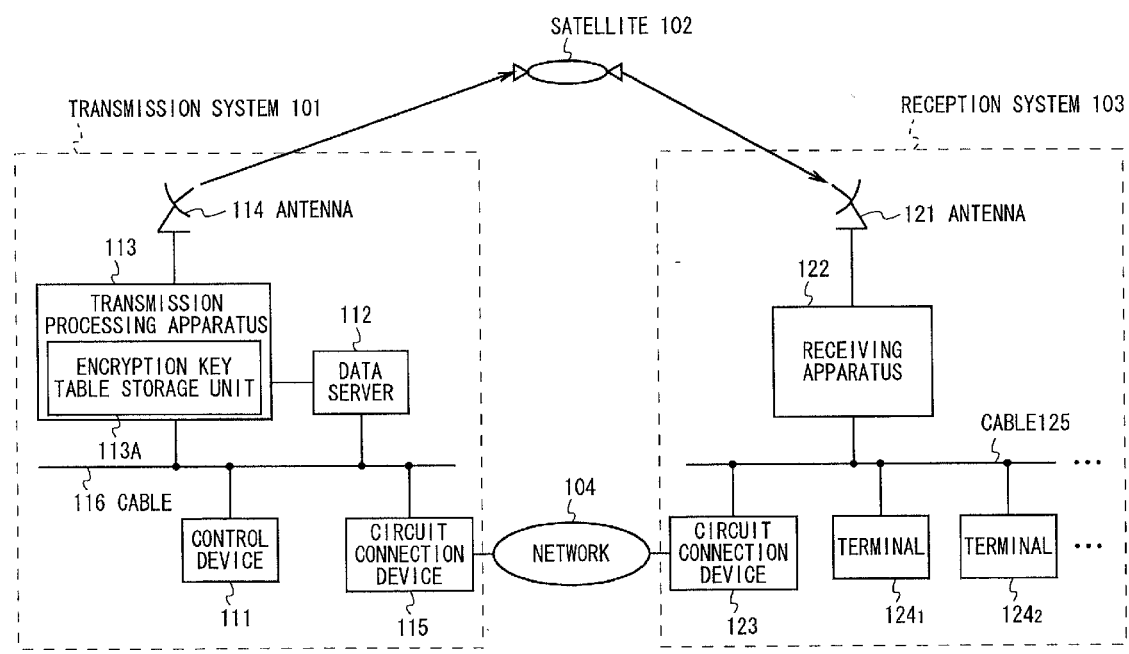
FIG. 7 is a block diagram showing an example of the structure of a broadcast system employing the present invention.

FIG. 7 shows a structural example of another embodiment of a broadcasting system of the invention. Here, the system comprises a plurality of devices that are logically assembled regardless of whether the devices are housed in the same housing.

In the embodiment shown in FIG. 7, a broadcast system includes a transmission system 101, a satellite 102, a reception system 103, and a network 104. To avoid unneeded complexity, only one reception system 103 is shown in FIG. 7 though two or more reception systems may be employed.

The transmission system 101 comprises a control device 111, a data server 112, a transmission processing device 113, an antenna 114, a circuit connection device 115, and a cable 116. The control device 111, the data server 112, the transmission processing device 113, and the circuit connection device 115 are connected to each other via the cable 116 as part of a Local Area Network (LAN).

The control device 111 enables the transmission processing device 113 to supply data for distribution by satellite transmission by its controlling the data server 112. Also, the control device 111 controls and permits the circuit connection device 115 to obtain data from an external network 104, such as via the Internet, and lets the transmission processing device 113 provide the data. Furthermore, the control device 111 controls various processes in the transmission processing device 113.

The data server 112 retains data that is to be distributed by satellite transmission and supplies necessary data to the transmission processing device 113 under the control of the control device 111. The transmission processing device 113 packets the data that is supplied from the data server 112 and from the circuit connection device 115 into Internet Protocol (IP) packets under the control of the control device 111, and the device 113 blocks the IP packets into data blocks, known as sections, according to the multi-protocol encapsulation standard defined in, e.g., EN 301 192 V1.1.1 (1997-12), the DVB specification for European Telecommunications Standards Institute (ETSI) for data broadcasting. The transmission processing device 113 divides a section into payloads each having a given length, and each payload is appended with the header of a packet to form a transport stream (TS) which is further processed, such as using modulation and amplification, and which is finally transmitted as satellite broadcast waves via the antenna.

Also, the transmission processing device 113 has the MAC address of each of terminals $124_1$, $124_2$, . . . , shown in FIG. 7, as well as of terminals not shown in FIG. 7, to form a reception system 103. The device 113 includes an encryption key table storage unit 113A for storing an encryption key table in the form of a diagram oriented to the encryption key assigned to each MAC address. All the encryption keys assigned to each of the MAC addresses are basically different. However, the same encryption keys may be assigned to some of the MAC addresses.

The MAC address is a system of addresses according to the Institute of Electrical Electronics Engineers (IEEE) 802.3 standard, etc., and is an individual value of 48 bits for each communication port. The 48-bit MAC address includes a higher 24 bits which are an identification number of a manufacturer (or vendor) registered to and supervised by the IEEE. The lower 24 bits are a device identification number supervised by each vendor. Using the MAC address, an address of each of the terminals $124_1$, $124_2$, . . . can be specified.

According to the foregoing multiprotocol encapsulation, located within the section header is the MAC address that serves as the address of the terminal $124_i$ that is to receive the data stored in the payload of a section. When it is necessary to encrypt the data located in the payload, such as for an IP packet, the transmission processing device 113 retrieves an encryption key assigned to the MAC address of the terminal $124_i$ for arrangement within the section header. The encryption key is retrieved from the encryption key table stored in the encryption key table storage unit 113A and is used to encrypt an IP packet arranged in the payload of that section.

The encryption key table may be of the same type as a key table of a receiving apparatus 122 or may be of a different type. The encryption key table may be incorporated into a transmission system 101 or may be stored in a server (not shown) in a network 104 and retrieved through a circuit connection device 115.

The circuit connection device 115 comprises a modem, a Terminal Adaptor (TA), a Digital Service Unit (DSU), etc. for example. The circuit connection device 115 carries out communication control over the network 104.

A reception system 103 includes an antenna 121, the receiving apparatus 122, the circuit connection device 123, the terminals $124_1$, $124_2$, . . . , and the cable 125. The antenna 121, the receiving apparatus 122, the circuit connection device 123, and the terminals $124_1$, $124_2$, . . . are connected to each other via the cable 125 to form a LAN such as an Ethernet,™ for example.

The receiving apparatus 122 and the terminals $124_1$, $124_2$, . . . may be computers, for example. Though the receiving apparatus 122 and the terminals $124_1$, $124_2$, . . . are shown connected to each other with the cable 125 to form a LAN, they may instead be connected directly. Furthermore, the receiving apparatus 122 may be a board that can be inserted into a slot of a computer such as a terminal $124_i$. Also, the receiving apparatus 122 and circuit connection device 123 may be constituted in a singular computer.

Satellite broadcast waves transmitted from the transmission system 101 via the satellite 102 are received by the antenna 121 and are fed to the receiving apparatus 122. The receiving apparatus 122 processes the received signals, and the resultant data is supplied to a specific terminal $124_i$.

Similar to the circuit connection device 115, the circuit connection device 123 performs communication control over the network 104.

Each terminal $124_1$, $124_2$, may be a computer, for example, which receives necessary data from the receiving apparatus 122, and conducts processes such as displaying, outputting, and storing the data.

Figure 8:
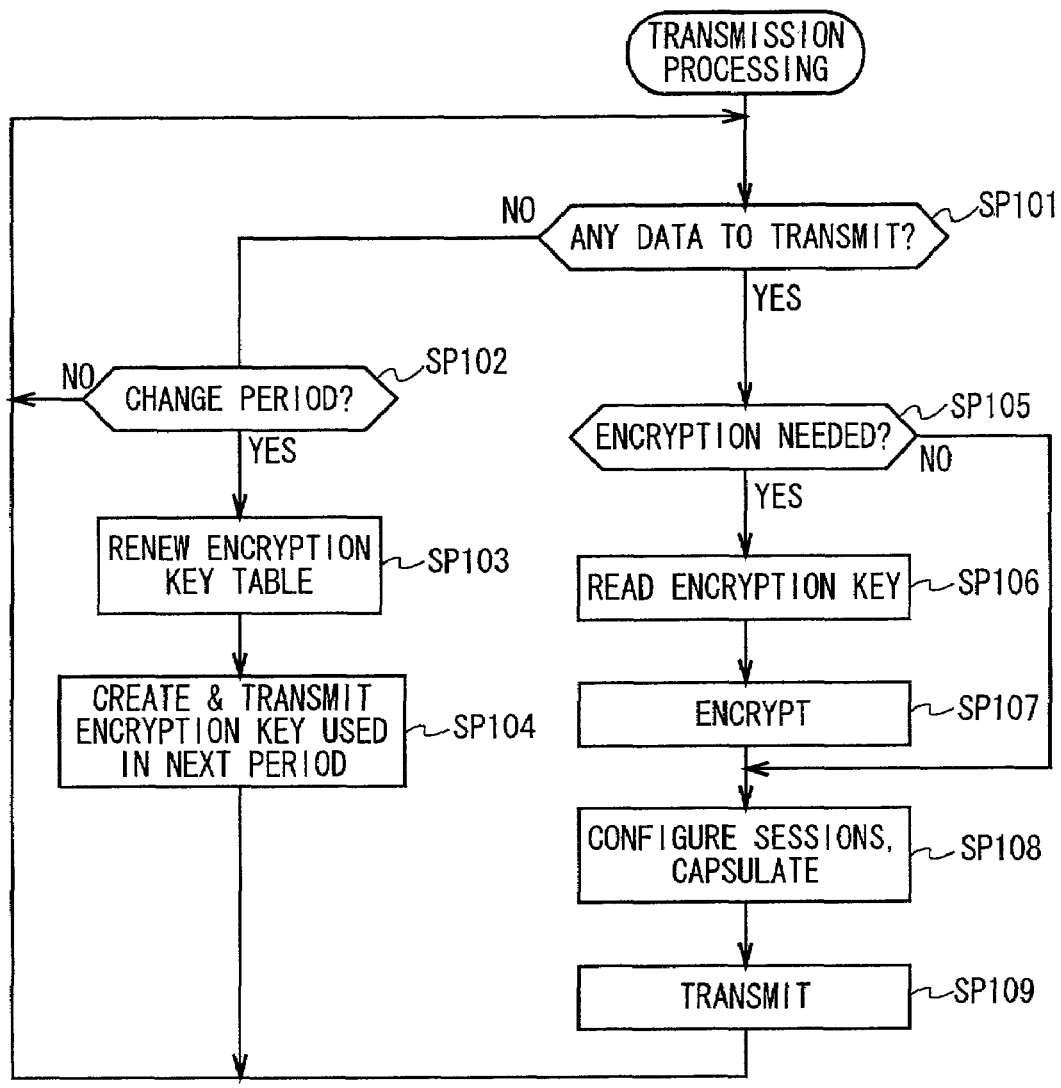
FIG. 8 is a flowchart illustrating the steps of the processing operation of the invention carried out by transmission system shown in FIG. 7.

A data transmission process performed by the transmission system 101 is described with reference to a flowchart shown in FIG. 8.

First, as shown at step SP101, the control device 111 judges whether data is present for transmission to a terminal $124_i$. The control device 111 uses a schedule table comprising a schedule to be transmitted to judge whether such data exists. The terminal $124_i$ may demand data from the transmission system 101 over the network 104 by controlling the circuit connection device 123, and the control device 111 may judge whether such data exists depending upon whether the circuit connection device 115 receives such a demand over the network 104.

When data for transmission to the terminal $124_i$ exists, the control device 111 proceeds to the step SP102 and judges whether to change a period. The transmission system 101 is designed with encryption keys that are held in an encryption key table in the encryption key table storage unit 113 and that are renewed periodically or in irregular intervals. A period in which data is encrypted using an encryption key obtained as a result of a renewal every other time starting from a second time, for example, is called an Even period. A period in which data is encrypted using an encryption device obtained as a result of a renewal every other time starting from a first period is called an Odd period. The control device 102 judges at the step SP 102 whether it is the time to change from an Even period to an Odd period or to change from an Odd period to an Even period.

When the control device 111 judges that a period is not to be changed, namely, that it is to continue to encrypt data using the encryption key presently being used, it returns to the step SP101 to repeat the process. When the control device judges that a period is to be changed from an Even period to an Odd period or from an Odd period to an Even period, it proceeds to the step SP103 where the control device 111 replaces an encryption key stored in the encryption key table with an encryption key previously created at the step SP104. Encryption at the transmission processing device 113 is thereafter performed using the encryption key At the step SP104, the control device 111 creates or obtains an encryption key that is to be used for the next period and supplies the key to the transmission processing device 113 which transmits it as the decoding key. Then, the control device 111 returns to the step shown at SP101. The transmission of the decoding key may be carried out over a network as well as via the satellite 102.

When a new decoding key for use in the next period is transmitted to a reception system 103 before the start of the next period, it is possible that the new decoding key may not be sent in time for the start of the next period. Therefore, the new encryption key used in the next period is distributed to the reception system 103 during a previous period.

On the other hand, when the control device judges that data exists to be transmitted to a terminal 124$_i$, the control device 111 lets the transmission processing device 113 transmit the data by controlling the data server 112 or the circuit connection device 115. Upon the receipt of the data from the data server 112 or from the circuit connection device 115, the transmission processing device 113 packets the data into IP packets and proceeds to the step shown at SP105.

The transmission processing device 113 judges, as shown at the step SP105, whether it is necessary to encrypt the IP packet, and when it is not necessary, the device 113 proceeds directly to the step SP108.

When the IP packet is judged as one that is to be encrypted, the device 113 moves on the step SP106 and retrieves an encryption key assigned to the MAC address of a terminal 124$_i$ from the encryption key table. Then, step SP107, the transmission processing device 113 encrypts the IP packet using the retrieved key and proceeds to the step SP108.

Figure 9:
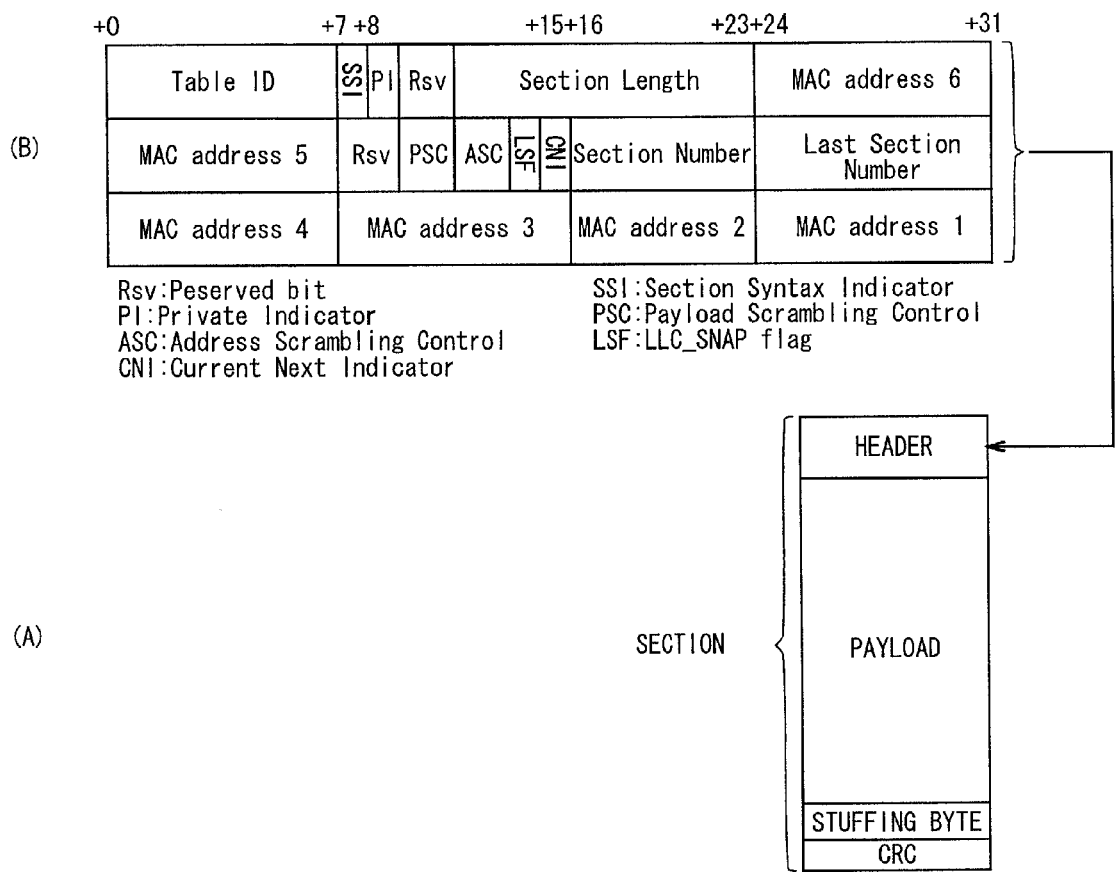
FIG. 9 is a diagram showing the format of a section and a section header.

As step SP108 shows, the transmission processing device uses a Cyclic Redundancy Checking code (CRC) or checksum on the IP packet. As a result, a section as shown in FIG. 9(A) is formed having the IP packet as the payload, the CRC code at its bottom, and the section header at its top. A stuffing byte is inserted between the payload and CRC, if needed.

The section header is composed of 3 bytes (96 bits), as shown in FIG. 9(B). Detailed explanation of the section header is described in the foregoing EN 301 192 V1.1.1 (1997-12) standard, but it should be noted that a 48-bit MAC address is divided among the MAC addresses 1 to 6. Arranged at the MAC address 1 are eight of the highest bits of the MAC address, and arranged at the MAC address 2 are the next highest eight bits. Similarly, successive eight bits of the MAC address are arranged at each of the MAC addresses 3 to 5, respectively, with the lowest 8 bits of the MAC address located at the MAC address 6.

After constituting a data section, the transmission processing device 113 divides that section into payloads each having a given length. The processing device then encapsulates the payload to form a TS type packet by appending the header of the TS packet to each payload to form a MPEG 2 transport stream. Then, the transmission processing device 113 proceeds to the step SP109, where modulation, amplification, etc. are carried out on the resultant packet. The packet is called a TS packet hereinafter because the packet can be processed in a similar way as for the TS packet. The TS packet is transmitted as satellite broadcasting waves from the antenna 114, and then the device 113 returns to the step SP101.

As shown in the section header in FIG. 9(B), a payload scrambling control (PSC) of 2 bits length is located at the 43rd bit and 44th bits. One bit is used, for example, as an encryption judgment flag to indicate whether data arranged in the payload of the section is encrypted, and the other bit is used as a period judgment flag that denotes whether the data is in and Even or Odd period.

Specifically, the lower bit of the PSC is the encryption judgment flag and has the value 1 when the data has been encrypted and has the value 0 when the data is not encrypted. The higher bit of the PSC is used as the period judgment flag and is of value 0 in an Even period and of value 1 in an Odd period. Alternatively, the higher bit of the PSC may be used as the encryption judgment flag, and the lower bit may be used as the period judgment flag. It is also possible to assign the values of 0 and 1 to the encryption judgment flag and to the period judgment flag to have the opposite meanings of the above.

In the EN 301 192 V1.1.1(1997-12) standard, when the PSC is of value 00B, where B indicates that the value shown before it is a binary number, data has not been encrypted. Accordingly, it is preferable to define the encryption judgment flag to be of value 1 when data has been encrypted and of value 0 when not encrypted, resulting in conformity with the DVB specification.

As described above, in the broadcasting system shown in FIG. 7, data is encrypted using an encryption key assigned to the MAC address corresponding to each terminal 124$_i$. Thus, each terminal 124$_i$ can be controlled with regard to reception, thereby realizing an ultimate conditional access mechanism.

The Japan Patent Laid Open No. 215244/1998, by the applicant of the present invention, discloses in detail the method of realizing a conditional access mechanism for performing exact reception control by assigning an encryption key to the value inherent to the receiving side, such as a MAC address or an IP address. However, the communications satellite broadcasting of Japan conforms to a specification derived from the Digital Video Broadcasting—Service Information/EN300 468 (DVB-SI), and the use of the MAC address conforms to that specification.

Figure 10:
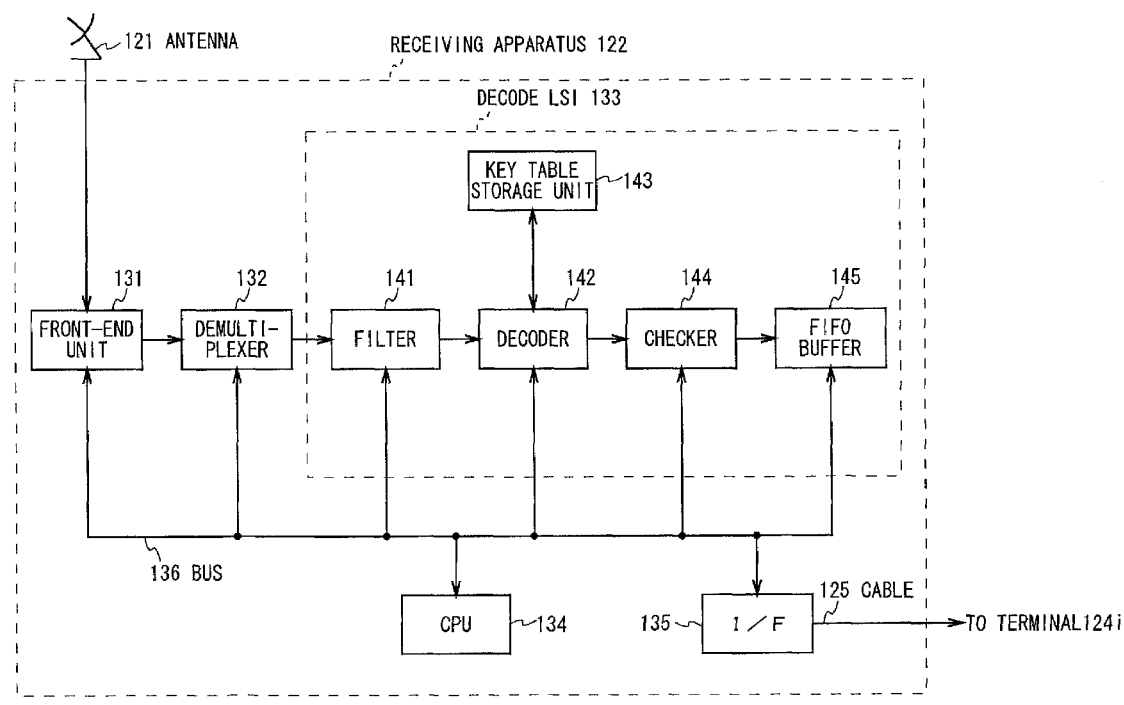
FIG. 10 is a block diagram showing the structure of a receiving apparatus shown in FIG. 7.

Next, FIG. 10 shows an example of the structure of the receiving apparatus 122 shown in FIG. 7.

The antenna 121 receives satellite broadcasting waves transmitted from the transmission system 101 via the satellite 102, and the received signals are outputted to a front-end unit 131. The front-end unit 131 selects the signal of a specific channel from the signals received by the antenna 121 under the control of a CPU 134, and the signal is further decoded to a digital stream, such as an IP_datagram_data_byte of a TS packet, and delivered to a demultiplexer 132. The demultiplexer 132 extracts a specific TS packet from the digital stream coming from the front-end unit 131, also under the control of the CPU 134, and sends the TS packet to a decoding Large Scale Integrated (CSI) Circuit 133. That is, the demultiplexer 132 selects TS packets based on the Packet Identification (PID) arranged in the header of the TS packet, and outputs only the selected TS packets to the decoding LSI device 133.

The decoding LSI device 133 is a one-chip LSI device comprising a filter 141, a decoder 142, a key table storage unit 143, a checker 144, and a First In First Out (FIFO) buffer 145.

The filter 141 examines the data, when needed, that is arranged in the payload of a section comprised of TS packets received from the demultiplexer 132, destroys unneeded TS packets, and delivers only the needed TS packet to the decoder 142.

The decoder 142 decodes the IP packets arranged in the payload of the TS packets that come from the filter 141 using a decoding key stored in the key table storage unit 143, and outputs the resultant to the checker 144. Also, as explained regarding FIG. 8, an encryption key is renewed in the transmission system 101, and when the renewed encryption key is transmitted, the decoder 142 renews the content of the key table storage unit 143 using that encryption key as the decoding key and under the control of CPU 134. Accordingly, the common key cryptosystem is used as the encryption method. However, the public key cryptosystem may also be used as an encryption method.

The key table storage unit 143 stores a key table in which the MAC addresses corresponding to the terminals 124$_1$, 1242, . . . , and in which decoding keys assigned to the MAC addresses are registered in correspondence with each other.

The checker 144 performs error detection on the IP packets outputted by the decoder 142 using the CRC code of a section located in that IP packet, under the control of CPU 134, to judge whether decoding is performed correctly in the decoder. The IP packets processed by the checker 144 are fed to the FIFO buffer 145 that temporarily retains the IP packets and outputs them to the Interface (I/F) 135 under the control of CPU 134. This process results in adjusting the data rate of the IP packets.

The CPU 134 controls the front-end unit 131, the demultiplexer 133, the decoding LSI 133, and the I/F 135. The I/F 135 functions as an interface that supplies the IP packets from the FIFO buffer 145 to a terminal $124_i$ through the cable 125 under the control of CPU 134.

FIG. 11 shows an example of the structure of the key table stored in the key table storage unit 143 in FIG. 10.

The key table contains the same number of entries as that of terminals $124_1$, $124_2$ . . . . The key table contains N units of entries #1 to #N so that the cable 125 is connected to the N number of terminals $124_1$ to $124_N$. The maximum number of entries on the key table is restricted by the storage capacity, etc. of the key table storage unit 143.

Registered on each entry #i, where i=1,2, . . . , N, are the MAC address #i of 48 bits of a terminal $124_i$, and a decoding key of m bits, where m denotes a cryptosystem in use, assigned to that MAC address. As explained above, an Even period and an Odd period exist with a different encryption key with each period so that two decoding keys are registered in each entry #i. A decoding key called an "Even decoding key", hereinafter referred to as $K_{Even\#i}$, is issued to decode data encrypted in an Even period, and an "Odd decoding key", hereinafter $K_{Odd\#i}$, is issued to decode data encrypted in an Odd period.

Furthermore, a Valid bit, called an "entry Valid bit" hereinafter, indicates whether the entry #i is valid and is appended to the head of the MAC address #i of each entry #i. Also, a Valid bit, called a "decoding key Valid bit" hereinafter, that indicates the validity is appended to each of Even decoding key $K_{Even\#i}$ and Odd decoding key $K_{Odd\#i}$.

As to the entry Valid bit and decoding key Valid bit, the value "1" denotes valid, and the value "0" denotes invalid for example. However, it is also possible to have the opposite value to the above case when assigning the value of the entry Valid and decoding key Valid bits, "0" and "1".

As described before, in the transmission system 101, a decoding key that corresponds to a new encryption key for the next period is distributed to the reception system 103 just before the next period. Accordingly, an Odd decoding key that corresponds to an encryption key for the next Odd period is distributed in an Even period, and an Even decoding key that corresponds to an encryption key for the next Even period is distributed during an Odd period. In the decoder 142, decoding keys that are distributed in such a manner are retained by an overwrite, for example, within the key table. Therefore, a decoding key that is to be used in the next period is set up in the key table before the current period terminates. Furthermore, because the change of decoding keys that accompanies the change of periods may be performed simply by switching the position, i.e., the address of the key table from which the decoder 142 retrieves, without involving CPU34, the change can be done rapidly.

The operation of a receiving apparatus in FIG. 10 is now explained with reference to a flowchart shown in FIG. 12.

The antenna 121 receives satellite broadcast waves transmitted from the transmission system 101 via the satellite 102, the received signals are transformed into a digital stream of a TS packets via front-end unit 131 and the demultiplexer 133, and the signal stream is supplied to the decoding LSI 133.

In the decoding LSI 133, a section of TS packets output by the demultiplexer 132 is supplied to the decoder 142 via the filter 141. Upon the receipt of the section, the decoder 142 retains the MAC address arranged in the section header as a variable MA in a built-in register.

The decoder 142 retrieves the stored entry of the MAC address that coincides with the variable MA by referring to the key table, as step SP111 shows. The decoder reads, in order, a MAC address registered in each entry #i starting from the entry #1 of the key table, and compares by checking the MAC address read and the variable MA to determine whether a MAC address entry matches the variable MA, as shown at the step SP112. When there is no MAC address entry that compares to the variable MA, namely when no terminal having the MAC address arranged in the section header is connected to the cable 125, the decoder 142 proceeds to the step shown at SP113, and destroys the section supplied, thereby terminating the processing.

Also, when there is an entry of a MAC address that compares to the variable MA, the decoder 142 proceeds to the step shown at SP114 with the entry it regards as the marked entry.

The decoder 142 judges, at the step SP114, whether that marked entry is valid based on the Valid bit of the marked entry. When the marked entry is not valid, namely when the Valid bit is "0", the decoder 142 proceeds to the step shown at SP113, and destroys the section supplied, thus terminating the processing. Thus, even when a terminal exists that has the MAC address arranged in the section header of a section supplied to the decoder 142, if the entry of that MAC address is not valid, the section is not supplied to that terminal.

When the marked entry is valid, that is when the Valid bit of the marked entry is "1", the decoder 142 proceeds to the step SP115 and judges whether the data i.e., the IP packet in the payload of the section, has been encrypted. The decoder 142 judges using the lower bit of the PSC of the section header shown in FIG. 9(B), namely the encryption judgment flag. When the encryption judgment flag is determined to be "0", that is when the IP packet arranged in the payload of the section has not been encrypted, the decoder 142 proceeds directly to the step shown at SP119, and outputs the unencrypted IP packet to the FIFO buffer 145 via the checker 144, thereby terminating processing. The IP packet stored in the FIFO buffer 145 is then supplied to a terminal $124_i$ specified by the MAC address in the section header of the section arranged in that IP packet.

When the decoder judges that the encryption judgment flag is of value "1", as shown at the step SP115, that is when the IP packet arranged in the payload of the section is encrypted, the decoder goes on to the step SP116 and sets the higher bit of the PSC of the section header of that section, namely the period judgment flag shown in FIG. 9(B), to the value of the variable EO in a built-in register, and then proceeds to the step SP117.

The decoder 142 judges, as shown at the step SP117, whether the decoding key Valid bit # (MA, EO) is valid during a period corresponding to the variable EO in the marked entry in which the MAC address matches the variable MA. That is, the decoder 142 judges during an Even period when the variable EO is "0" and during an Odd period when the variable EO is "1". When the decoding key Valid bit # (MA, EO) is not valid, that is that the decoding key Valid bit # (MA, EO) is "0", the decoder proceeds to the step SP113 and destroys the section supplied, thus terminating processing. Accordingly, even when a terminal exists having the MAC address arranged in the section header of the section supplied to the decoder 142 and the entry of that MAC address is valid, if the decoding key during a period indicated by the period judging flag is not valid, that section is not supplied to the terminal.

On the other hand, when the decoding key Valid flag # (MA, EO) is judged to be valid, namely when the decoding key Valid flag # (MA, EO) is "0", the decoder proceeds to the step SP118 and retrieves, from the key table, the decoding key (MA, EO) during a period matching the variable EO in the marked entry where the MAC address coincides with the variable MA. The decoder decodes the IP packet arranged in the payload of the section using the decoding key (MA. EO) and then proceeds to the step SP119.

The decoder 142 outputs the decoded IP packet to the FIFO buffer 145 via the checker 144, as step SP119 shows, and processing is terminated. Also, the IP packet stored in the FIFO buffer 145 is supplied to a terminal $124_i$ specified by the MAC address in the section header of the section having the IP packet.

Figure 12:
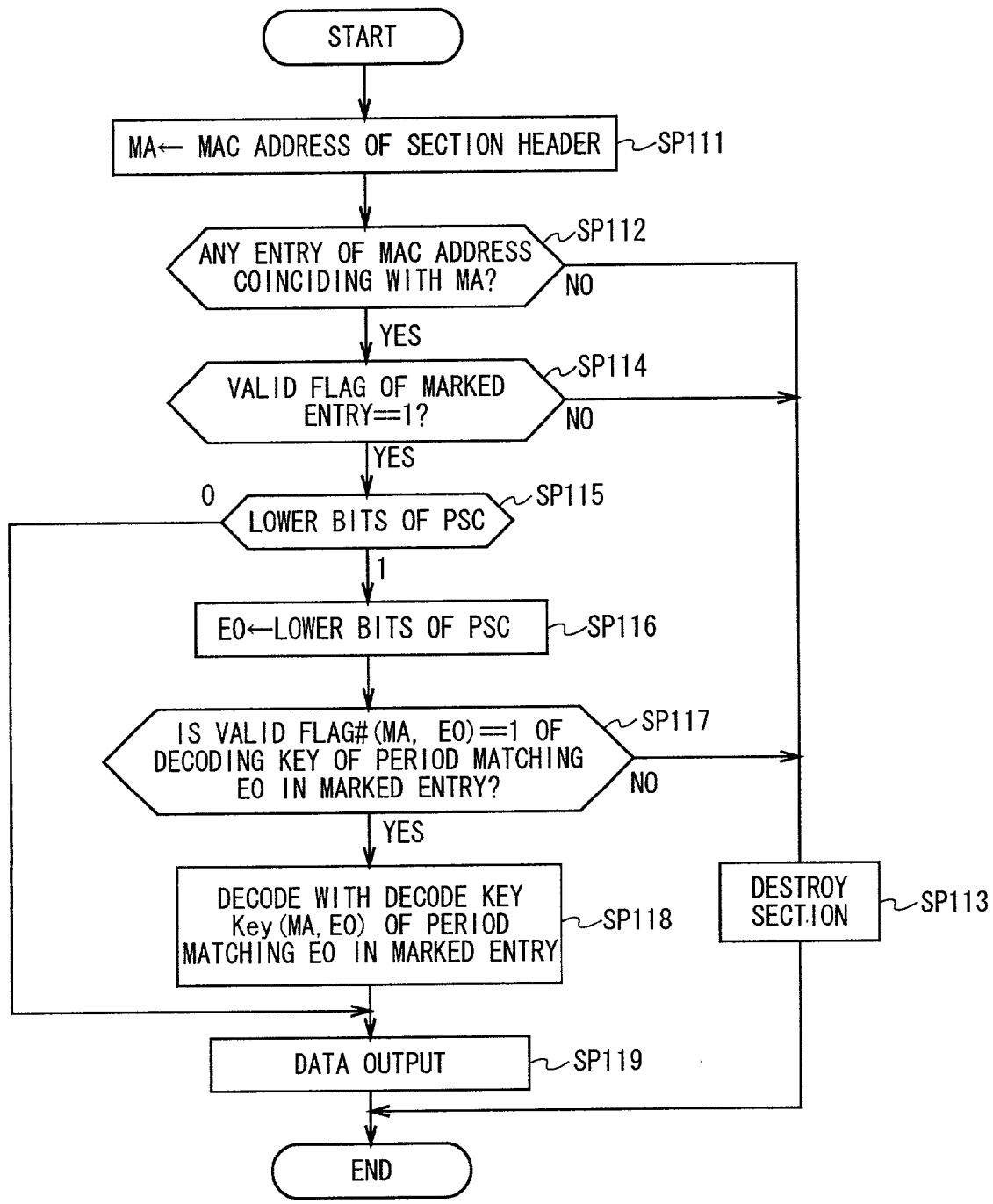
FIG. 12 is a flowchart illustrating the steps of a processing operation performed by the receiving apparatus shown in FIG. 10.

The process of the flowchart in FIG. 12 is performed every time a section is supplied to the decoder 142. As described above, the validity of the entry is judged based on the entry Valid bit stored in the entry of the key table, and the output of data to a terminal is controlled, so that it is possible to easily restrict users or terminals to obtain or receive data correctly. Furthermore, because the data output is controlled by the value of the decoding key Valid bit of the key table, a respective terminal may easily be allowed to receive data in only one period, either during an Even period or Odd period, or may be prohibited from receiving data in either period. The setting of values of the entry Valid bit and the decoding key Valid bit can be done in a receiving apparatus 122 independently, or may be done based on the information transmitted from the transmission system 101.

In this embodiment, a decoding key, as well as an encryption key, is assigned to the MAC address inherent to a terminal. However, it is also possible to define a terminal Identification (ID) inherent to a terminal and then assign a decoding key to that terminal ID. Furthermore, a group ID inherent to a plurality of terminals may be designated, and a decoding key assigned to that group ID. However, when assigning a decoding key to a MAC address, an exact conditional access mechanism may easily be incorporated, as described hitherto, into the outline of digital satellite broadcasting based on the EN 301 192 V1.1.1 (1997-12) standard, which is the DVB standard.

In this embodiment, the one-chip decoding LSI 133 comprises the filter 141, the decoder, 142, the key table storage unit 143, the checker 144, and the FIFO buffer 145. However, it is also possible to form a filter 141, decoder 142, key table storage unit 143, checker 144, and FIFO buffer 145 as separate chips. However, the employment of a one-chip decoding LSI 133 increases security because the data decoding is performed within the single decoding LSI 133, and is completely removed from the outside. Furthermore, to reduce the installation area of circuits and high-speed processing, it is preferable to use a one-chip decoding LSI 133.

Further, in this embodiment, the digital satellite broadcast distributes the data. However, the present invention may be applied to a case where the data is distributed using a multicast, for example.

Further, in the present embodiment, two types of periods, namely Even and Odd periods, are provided. However, it is also possible to not use such periods, or to provide more than two types of periods. Likewise, it is possible to have only one decoding key or more than two decoding keys associated with each entry of the key table.

In the present embodiment, data is distributed based on the DVB standards. However, data may instead be distributed in a form, not based on the DVB standards. Moreover, the foregoing processes may be performed not only with hardware but also with software. Namely, a program constituting the software is installed on a general-purpose computer or one-chip microcomputer.

Figure 13:
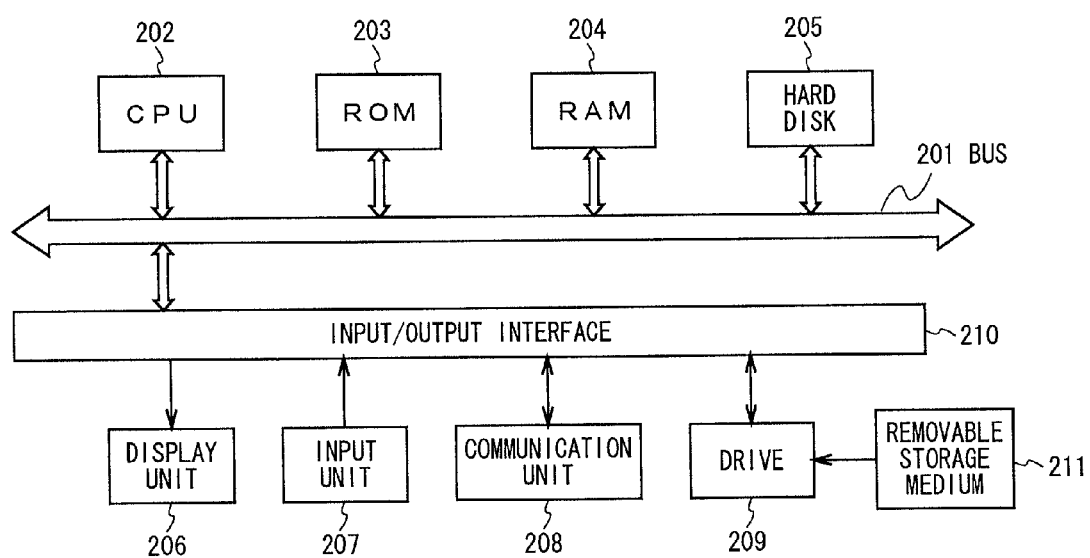
FIG. 13 is a block diagram showing an example of a processor employing the present invention.

FIG. 13 shows an example of the structure of a further embodiment in which a computer is provided with a program performing the foregoing processes.

A program is stored in a storage medium, such as a hard disk 205 or ROM 203, which is built into a computer.

Alternatively, a program may be stored or recorded, either temporarily or perpetually, in a removable recording medium 211 such as a floppy disk, Compact Disc Read Only Memory (CD-ROM), Magneto Optical (MO) disc, Digital Versatile Disc (DVD), magnetic disc, or semi-conductor memory. A removable recording medium 211 may be provided as a software package.

Instead of a removable recording medium 211, a program may be transferred to a computer using a wireless connection, such as from a download site via an artificial satellite link for digital satellite broadcasting, or may be transferred using a wire connection over a network, such as a Local Area Network (LAN) or the Internet. The computer receives such transferred programs at a communications unit 208 which can be installed in the built-in hard disk 205.

The computer incorporates a Central Processing Unit (CPU) 202 that is connected to an input/output interface 210 via a bus 201. The CPU 202 executes a program stored in a Read Only Memory (ROM) 203 according to commands entered by a user through the input/output interface 210 using an input unit 207 such as a keyboard and mouse, etc. Also, the CPU 202 loads into a Random Access Memory (RAM) 204 and executes programs stored in the hard disk 110, which are transferred from a satellite or over a network to the communications unit 208 and installed in the hard disk 205, or which are installed in the hard disk 205 after being retrieved from the removable recording media 211 that is inserted into the drive 209. In this manner, the CPU 202 performs processes according to the foregoing flowchart or performs processes according to the structure of the foregoing block diagrams. Also, the CPU 202 may output, when required, the processed results to an output unit 206, such as a Liquid Crystal Display (LCD) or a speaker, etc., through an input/output interface 210, or the CPU may transmit the output from the communications unit 208. Furthermore, the CPU may transmit the output to the hard disk to record the output.

As to the present specification, the above processing steps, which describe a program to permit the computer perform various processes, are not necessarily followed in a time sequence along the order described in the flowchart. Rather, the specification includes processes that may be performed concurrently or individually, e.g., using concurrent processing or processing with objects.

Also, the programs may be those that are processed by a single computer or by a plurality of computers using distributed processing. Furthermore, the programs may be transferred to a computer located in a faraway site for execution. The present invention can be utilized for the data transmission system using the digital satellite broadcasting and the data transmission system using the wired network.

The invention claimed is:

1. A method of processing received data for delivery to a respective one of a plurality of processing devices, each of said plurality of processing devices having a corresponding address, said method comprising:

reading an address from a portion of said received data; and decoding said portion of said received data to form decoded data when said portion of said received data is intended for a group of said processing devices that includes said respective one of said plurality of processing devices or when said portion of said received data is intended solely for said respective one of said plurality of processing devices;

said decoding step including determining whether said portion of said received data includes encrypted data, and when said portion of said received data includes encrypted data, decrypting said encrypted data using a decryption key that is either a private key or a public key, a determination of whether to decrypt said encrypted data using either an even period decryption key or an odd period decryption key being carried out based on an indicator read from said portion of said received data;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices.

2. The method of claim 1, wherein said decoding step includes decoding said portion of said received data when said portion of said received data is intended for all of said plurality of processing devices.

3. The method of claim 2, wherein said portion of said received data is intended for all of said plurality of processing devices when at least said segment of said read address is a predefined broadcast value.

4. The method of claim 1, wherein said segment of said read address is compared to said corresponding segment of said stored address by comparing, for each bit position identified by said stored mask sequence, a bit of said read address with its corresponding bit of said stored address.

5. The method of claim 1, wherein at least a segment of said corresponding address of each processing device of said group is common to all of said group, and said mask sequence identifies said bit positions of said common segment.

6. The method of claim 1, wherein said corresponding address of each processing device of said group is associated with a stored further address, at least a segment of said stored further address being common to all of said group, and said mask sequence identifies said bit positions of said common segment.

7. The method of claim 1, wherein said segment of said read address is compared with said corresponding segment of said stored address only when a stored value associated with said stored address indicates that said stored address is in a valid state.

8. The method of claim 1, wherein said read address is compared with said corresponding address by converting said read address into a value having fewer bits than said read address and then comparing said converted value to a stored value associated with said corresponding address.

9. The method of claim 8, wherein said read address is converted using a Hash function, and said stored value is stored in a Hash table.

10. The method of claim 1, wherein a determination of whether to decrypt said encrypted data using either said private key or said public key is carried out based on an indicator read from said portion of said received data.

11. A method of processing received data for delivery to a respective one of a plurality of processing devices, each of said plurality of processing devices having a corresponding address, said method comprising:

reading an address from a portion of said received data; and decoding said portion of said received data to form decoded data when said portion of said received data is intended for a group of said processing devices that includes said respective one of said plurality of processing devices or when said portion of said received data is intended solely for said respective one of said plurality of processing devices;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices wherein a table is searched to determine whether said read address indicates that said portion of said received data is intended for said group or is intended solely for said respective one of said plurality of processing devices, and when said portion of said received data is encrypted, said table is again searched to locate said stored address that coincides with said read address and then a decryption key corresponding to said stored address is retrieved, said decryption key being retrieved only when a stored value associated with said decryption key indicates that said decryption key is in a valid state.

12. An apparatus for processing received data for delivery to a respective one of a plurality of processing devices, each of said plurality of processing devices having a corresponding address, said apparatus comprising:

a decoder for reading an address from a portion of said received data, and for decoding said portion of said received data to form decoded data when said portion of said received data is intended for a group of said processing devices that includes said respective one of said plurality of processing devices or when said portion of said received data is intended solely for said respective one of said plurality of processing devices;

said decoder determining whether said portion of said received data includes encrypted data, and when said portion of said received data includes encrypted data, decrypting said encrypted data using a decryption key that is either a private key or a public key, said decoder carrying out a determination of whether to decrypt said encrypted data using either an even period decryption key or an odd period decryption key based on an indicator read from said portion of said received data;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices.

13. The apparatus of claim 12, wherein said decoder decodes said portion of said received data when said portion of said received data is intended for all of said plurality of processing devices.

14. The apparatus of claim 13, wherein said portion of said received data is intended for all of said plurality of processing devices when at least said segment of said read address is a predefined broadcast value.

15. The apparatus of claim 12, wherein said decoder compares said segment of said read address to said corresponding segment of said stored address by comparing, for each bit position identified by said stored mask sequence, a bit of said read address with its corresponding bit of said stored address.

16. The apparatus of claim 12, wherein at least a segment of said corresponding address of each processing device of said group is common to all of said group, and said mask sequence identifies said bit positions of said common segment.

17. The apparatus of claim 12, wherein said corresponding address of each processing device of said group is associated with a stored further address, at least a segment of said stored further address being common to all of said group, and said mask sequence identifies said bit positions of said common segment.

18. The apparatus of claim 12, wherein said decoder compares said segment of said read address with said corresponding segment of said stored address only when a stored value associated with said stored address indicates that said stored address is in a valid state.

19. The apparatus of claim 12, wherein said decoder compares said read address with said corresponding address by converting said read address into a value having fewer bits than said read address and then compares said converted value to a stored value associated with said corresponding address.

20. The apparatus of claim 19, wherein said decoder converts said read address using a Hash function, and said stored value is stored in a Hash table.

21. The apparatus of claim 12, wherein said decoder carries out a determination of whether to decrypt said encrypted data using either said private key or said public key based on an indicator read from said portion of said received data.

22. An apparatus for processing received data for delivery to a respective one of a plurality of processing devices, each of said plurality of processing devices having a corresponding address, said apparatus comprising:

a decoder for reading an address from a portion of said received data, and for decoding said portion of said received data to form decoded data when said portion of said received data is intended for a group of said processing devices that includes said respective one of said plurality of processing devices or when said portion of said received data is intended solely for said respective one of said plurality of processing devices;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices wherein said decoder searches a table to determine whether said read address indicates that said portion of said received data is intended for said group or is intended solely for said respective one of said plurality of processing devices, and when said portion of said received data is encrypted, said decoder again searches said table to locate said stored address that coincides with said read address and then retrieves a decryption key corresponding to said stored address, and said decoder retrieves said decryption key only when a stored value associated with said decryption key indicates that said decryption key is in a valid state.

23. A readable medium recorded with instructions for processing received data for delivery to a respective one of a plurality of processing devices, each of said plurality of processing devices having a corresponding address, said instructions comprising:

reading an address from a portion of said received data; and decoding said portion of said received data to form decoded data when said portion of said received data is intended for a group of said processing devices that includes said respective one of said plurality of processing devices or when said portion of said received data is intended solely for said respective one of said plurality of processing devices;

said decoding step including determining whether said portion of said received data includes encrypted data, and when said portion of said received data includes encrypted data, decrypting said encrypted data using a decryption key that is either a private key or a public key, a determination of whether to decrypt said encrypted data using either an even period decryption key or an odd period decryption key being carried out based on an indicator read from said portion of said received data;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices.

24. A method of delivering data to a respective one of a plurality of processing devices, each of said plurality of processing devices having a corresponding address, said method comprising:

receiving transmitted data;

reading an address from a portion of said received data;

decoding said portion of said received data to form decoded data when said portion of said received data is intended for a group of said processing devices that includes said respective one of said plurality of processing devices or when said portion of said received data is intended solely for said respective one of said plurality of processing devices;

said decoding step including determining whether said portion of said received data includes encrypted data, and when said portion of said received data includes encrypted data, decrypting said encrypted data using a decryption key that is either a private key or a public key, a determination of whether to decrypt said encrypted data using either an even period decryption key or an odd period decryption key being carried out based on an indicator read from said portion of said received data;

delivering said decoded data to said respective one of said plurality of processing devices;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices.

25. An apparatus for delivering data to a respective one of a plurality of processing devices, each of said plurality of processing devices having a corresponding address, said apparatus comprising:

a receiver for receiving transmitted data;

a decoder for reading an address from a portion of said received data, decoding said portion of said received data to form decoded data when said portion of said received data is intended for a group of said processing devices that includes said respective one of said plurality of processing devices or when said portion of said received data is intended solely for said respective one of said plurality of processing devices, and delivering said decoded data to said respective one of said plurality of processing devices;

said decoder determining whether said portion of said received data includes encrypted data, and when said portion of said received data includes encrypted data, decrypting said encrypted data using a decryption key that is either a private key or a public key, said decoder carrying out a determination of whether to decrypt said encrypted data using either an even period decryption key or an odd period decryption key based on an indicator read from said portion of said received data;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices.

26. A readable medium recorded with instructions for delivering data to a respective one of a plurality of processing devices, each of said plurality of processing devices having a corresponding address, said instructions comprising:

receiving transmitted data;

reading an address from a portion of said received data;

decoding said portion of said received data to form decoded data when said portion of said received data is intended for a group of said processing devices that includes said respective one of said plurality of processing devices or when said portion of said received data is intended solely for said respective one of said plurality of processing devices;

said decoding step including determining whether said portion of said received data includes encrypted data, and when said portion of said received data includes encrypted data, decrypting said encrypted data using a decryption key that is either a private key or a public key, a determination of whether to decrypt said encrypted data using either an even period decryption key or an odd period decryption key being carried out based on an indicator read from said portion of said received data;

delivering said decoded data to said respective one of said plurality of processing devices;

said portion of said received data being determined to be intended for said group by comparing at least a segment of said read address to a corresponding segment of a stored address that is associated with said group, said segment of said read address and said corresponding segment of said stored address being identified by a stored mask sequence; and said portion of said received data being determined to be intended solely for said respective one of said plurality of processing devices by comparing said read address to said corresponding address of said respective one of said plurality of processing devices.

27. A method of processing data for transmission to at least one of a plurality of processing devices, each of said plurality of processing devices having a corresponding address, said method comprising:

encoding at least a portion of said data; and attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group;

said encoding step including encrypting part of said portion of said data using an encryption key associated with said control address, and attaching a flag indicating whether said part of said portion of said data is encrypted using an even period encryption key or is encrypted using an odd period encryption key.

28. The method of claim 27, wherein said segment of said control address is a predefined broadcast value when said portion of said data is intended for all of said plurality of processing devices.

29. The method of claim 27, wherein at least a segment of said corresponding address of each processing device of said group is common to all of said processing devices in said group, and when said portion of the data is intended for each of said processing devices in said group, said segment of said control address comprises said segment of said corresponding address.

30. The method of claim 27, wherein said corresponding address of each of said processing devices in said group is associated with a further address, at least a segment of said further address being common to all of said processing devices in said group, and when said portion of said data is intended for each of said processing devices in said group, said segment of said control address comprises said segment of said further address.

31. The method of claim 27, wherein, when said portion of said data is intended solely for said respective one of said plurality of processing devices, said control address is convertible into a value having fewer bits than said control address, said converted value being associated with said corresponding address.

32. The method of claim 27, wherein said encoding step includes attaching a flag indicating whether said portion of said data includes encrypted data.

33. The method of claim 27, wherein, when said portion of said data is intended solely for said respective one of said plurality of processing devices, said encryption key corresponds to said respective one of said plurality of processing devices.

34. The method of claim 27, wherein, when said portion of said data is intended for said respective one of said plurality of processing devices, said encryption key corresponds to said group.

35. A method of processing data for transmission to at least one of a plurality of processing devices, each of said plurality of processing devices having a corresponding address, said method comprising:
encoding at least a portion of said data; and
attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group
wherein said encoding step includes encrypting part of said portion of said data using an encryption key associated with said control address and determining whether said encryption key is to be changed from an odd period encryption key to an even period encryption key or from an even period encryption key to an odd period encryption key.

36. An apparatus for processing data for transmission to at least one of a plurality of processing devices, each of said plurality of processing devices having a corresponding address, said apparatus comprising:
an encoder for encoding at least a portion of said data and for attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group;
said encoder encrypting part of said portion of said data using an encryption key associated with said control address, and attaching a flag indicating whether said part of said portion of said data is encrypted using an even period encryption key or is encrypted using an odd period encryption key.

37. The apparatus of claim 36, wherein said segment of said control address is a predefined broadcast value when said portion of said data is intended for all of said plurality of processing devices.

38. The apparatus of claim 36, wherein at least a segment of said corresponding address of each processing device of said group is common to all of said processing devices in said group, and when said portion of said data is intended for each of said processing devices in said group, said segment of said control address comprises said segment of said corresponding address.

39. The apparatus of claim 36, wherein said corresponding address of each of said processing devices in said group is associated with a further address, at least a segment of said further address being common to all of said processing devices in said group, and when said portion of the data is intended for each of said processing devices in said group, said segment of said control address comprises said segment of said further address.

40. The apparatus of claim 36, wherein, when said portion of said data is intended solely for said respective one of said plurality of processing devices, said control address is convertible into a value having fewer bits than said control address, said converted value being associated with said corresponding address.

41. The apparatus of claim 36, wherein said encoder attaches a flag indicating whether said portion of said data includes encrypted data.

42. The apparatus of claim 36, wherein, when said portion of said data is intended solely for said respective one of said plurality of processing devices, said encryption key corresponds to said respective one of said plurality of processing devices.

43. The apparatus of claim 36, wherein, when said portion of said data is intended for said respective one of said plurality of processing devices, said encryption key corresponds to said group.

44. An apparatus for processing data for transmission to at least one of a plurality of processing devices, each of said plurality of processing devices having a corresponding address, said apparatus comprising:
an encoder for encoding at least a portion of said data and for attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group wherein said encoder encrypts part of said portion of said data using an encryption key associated with said control address and determines whether said encryption key is to be changed from an odd period encryption key to an even period encryption key or from an even period encryption key to an odd period encryption key.

45. A readable medium recorded with instructions for processing data for transmission to at least one of a plurality of processing devices, each of said plurality of processing devices having a corresponding address, said instructions comprising:

encoding at least a portion of said data; and attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group;

said encoding step including encrypting part of said portion of said data using an encryption key associated with said control address, and attaching a flag indicating whether said part of said portion of said data is encrypted using an even period encryption key or is encrypted using an odd period encryption key.

46. A method of transmitting data to at least one of a plurality of processing devices, each of said plurality of processing devices having a corresponding address, said method comprising:

encoding at least a portion of said data;

said encoding step including encrypting part of said portion of said data using an encryption key associated with said control address, and attaching a flag indicating whether said part of said portion of said data is encrypted using an even period encryption key or is encrypted using an odd period encryption key;

attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group; and transmitting said portion of said data.

47. An apparatus for transmitting data to at least one of a plurality of processing devices, each of said plurality of processing devices having a corresponding address, said apparatus comprising:

an encoder for encoding at least a portion of said data and for attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group;

said encoder encrypting part of said portion of said data using an encryption key associated with said control address, and attaching a flag indicating whether said part of said portion of said data is encrypted using an even period encryption key or is encrypted using an odd period encryption key; and a transmitter for transmitting said portion of said data.

48. A readable medium recorded with instructions for transmitting data to at least one of a plurality of processing devices, each of said plurality of processing devices having a corresponding address, said instructions comprising:

encoding at least a portion of said data;

attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices and being identifiable by a mask sequence associated with said group of said processing devices when said portion of said data is intended for each of said processing devices in said group; and said encoding step including encrypting part of said portion of said data using an encryption key associated with said control address, and attaching a flag indicating whether said part of said portion of said data is encrypted using an even period encryption key or is encrypted using an odd period encryption key;

transmitting said portion of the data.

49. A method of sending data to at least one of a plurality of processing devices, each of said plurality of processing devices having a corresponding address, said method comprising:

encoding at least a portion of said data;

attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices when said portion of said data is intended for each of said processing devices in said group;

said encoding step including encrypting part of said portion of said data using an encryption key associated with said control address, and attaching a flag indicating whether said part of said portion of said data is encrypted using an even period encryption key or is encrypted using an odd period encryption key;

transmitting said portion of said data;

receiving said portion of said data;

reading said control address from said portion of said data;

decoding said portion of the data to form decoded data when said portion of said data is intended for a group of said processing devices that includes said respective one of said plurality of processing devices or when said portion of said data is intended solely for said respective one of said plurality of processing devices; and said decoding step including determining whether said portion of said data includes encrypted data, and when said portion of said data includes encrypted data, decrypting said encrypted data using a decryption key that is either a private key or a public key, a determination of whether to decrypt said encrypted data using either an even period decryption key or an odd period decryption key being carried out based on an indicator read from said portion of said data;

delivering said decoded data to said respective one of said plurality of processing devices;

said portion of said data being determined to be intended for said group by comparing at least a segment of said control address to a corresponding segment of a stored address that is associated with said group, said segment of said control address and said corresponding segment of said stored address being identified by a stored mask sequence; and said portion of said data being determined to be intended solely for said respective one of said plurality of processing devices by comparing said control address to said corresponding address of said respective one of said plurality of processing devices.

50. A system for sending data to at least one of a plurality of processing devices, each of said plurality of processing devices having a corresponding address, said system comprising:

an apparatus for transmitting data, said apparatus comprising:

an encoder for encoding at least a portion of said data and for attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices when said portion of said data is intended for each of said processing devices in said group;

said encoder encrypting part of said portion of said data using an encryption key associated with said control address, and attaching a flag indicating whether said part of said portion of said data is encrypted using an even period encryption key or is encrypted using an odd period encryption key; and a transmitter for transmitting said portion of the data; and an apparatus for receiving data, said apparatus comprising:

a receiver for receiving said portion of said data; and a decoder for reading said control address from said portion of said data, decoding said portion of the data to form decoded data when said portion of the data is intended for a group of said processing devices that includes said respective one of said plurality of processing devices or when said portion of said data is intended solely for said respective one of said plurality of processing devices, and delivering said decoded data to said respective one of said plurality of processing devices;

said decoder determining whether said portion of said data includes encrypted data, and when said portion of said data includes encrypted data, decrypting said encrypted data using a decryption key that is either a private key or a public key, said decoder carrying out a determination of whether to decrypt said encrypted data using either an even period decryption key or an odd period decryption key based on an indicator read from said portion of said data;

said portion of said data being determined to be intended for said group by comparing at least a segment of said control address to a corresponding segment of a stored address that is associated with said group, said segment of said control address and said corresponding segment of said stored address being identified by a stored mask sequence; and said portion of said data being determined to be intended solely for said respective one of said plurality of processing devices by comparing said control address to said corresponding address of said respective one of said plurality of processing devices.

51. At least one readable medium recorded with instructions for sending data to at least one of a plurality of processing devices, each of said plurality of processing devices having a corresponding address, said instructions comprising:

encoding at least a portion of said data;

attaching a control address to said portion of said data, said control address being associated with said corresponding address of a respective one of said plurality of processing devices when said portion of said data is intended solely for said respective one of said plurality of processing devices, at least a segment of said control address being associated with a group of said processing devices when said portion of said data is intended for each of said processing devices in said group;

said encoding step including encrypting part of said portion of said data using an encryption key associated with said control address, and attaching a flag indicating whether said part of said portion of said data is encrypted using an even period encryption key or is encrypted using an odd period encryption key;

transmitting said portion of said data;

receiving said portion of said data;

reading said control address from said portion of said data;

decoding said portion of the data to form decoded data when said portion of said data is intended for a group of said processing devices that includes said respective one of said plurality of processing devices or when said portion of said data is intended solely for said respective one of said plurality of processing devices; and said decoding step including determining whether said portion of said data includes encrypted data, and when said portion of said data includes encrypted data, decrypting said encrypted data using a decryption key that is either a private key or a public key, a determination of whether to decrypt said encrypted data using either an even period decryption key or an odd period decryption key being carried out based on an indicator read from said portion of said data;

delivering said decoded data to said respective one of said plurality of processing devices;

said portion of said data being determined to be intended for said group by comparing at least a segment of said control address to a corresponding segment of a stored address that is associated with said group, said segment of said control address and said corresponding segment of said stored address being identified by a stored mask sequence; and said portion of said data being determined to be intended solely for said respective one of said plurality of processing devices by comparing said control address to said corresponding address of said respective one of said plurality of processing devices.

* * * * *

UNITED STATES PATENT AND TRADEMARK OFFICE
CERTIFICATE OF CORRECTION

PATENT NO. : 7,069,436 B1 Page 1 of 1
APPLICATION NO. : 09/869515
DATED : June 27, 2006
INVENTOR(S) : Masateru Akachi It is certified that error appears in the above-identified patent and that said Letters Patent is hereby corrected as shown below:

Column 7, line 29, "($\sim(MR_1 \wedge A\ MAC_1(k))$) & $MASK_1(k)$ (1)" should read --($\sim(MR_1 \wedge MAC_1(k))$) & $MASK_1(k)$ (1),--.

Signed and Sealed this

Fourteenth Day of November, 2006

JON W. DUDAS
*Director of the United States Patent and Trademark Office*